(12) United States Patent
Liang

(10) Patent No.: US 11,944,904 B2
(45) Date of Patent: Apr. 2, 2024

(54) DATA SYNCHRONIZATION METHOD AND APPARATUS, TERMINAL, SERVER, AND STORAGE MEDIUM

(71) Applicant: Tencent Technology (Shenzhen) Company Limited, Shenzhen (CN)

(72) Inventor: Chao Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/701,061

(22) Filed: Mar. 22, 2022

(65) Prior Publication Data
US 2022/0212109 A1    Jul. 7, 2022

Related U.S. Application Data

(63) Continuation of application No. PCT/CN2021/077446, filed on Feb. 23, 2021.

(30) Foreign Application Priority Data

Apr. 8, 2020 (CN) .......................... 202010268946.1

(51) Int. Cl.
*A63F 13/57* (2014.01)
*A63F 13/537* (2014.01)

(52) U.S. Cl.
CPC ............ *A63F 13/57* (2014.09); *A63F 13/537* (2014.09)

(58) Field of Classification Search
CPC ................................ A63F 13/57; A63F 13/537
See application file for complete search history.

(56) References Cited

U.S. PATENT DOCUMENTS

| 2003/0064783 A1* | 4/2003 | Baerlocher | ......... G07F 17/3244 |
| | | | 463/20 |
| 2004/0002380 A1* | 1/2004 | Brosnan | .................. G07F 17/38 |
| | | | 463/32 |

(Continued)

FOREIGN PATENT DOCUMENTS

| CN | 108260021 A | 7/2018 |
| CN | 108540454 A | 9/2018 |

(Continued)

OTHER PUBLICATIONS

International Search Report and Written Opinion with English Translation for International Patent Application No. PCT/CN2021/077446 dated May 26, 2021, 12 pages.

*Primary Examiner* — Steve Rowland
(74) *Attorney, Agent, or Firm* — Crowell & Moring LLP

(57) ABSTRACT

A data synchronization method and apparatus, a terminal, a server, and a storage medium. The method includes: in response to a throwing operation on a virtual prop, controlling the virtual prop to move in a virtual scene according to a first movement trajectory; acquiring collision information and movement information of the virtual prop in response to a collision between the virtual prop and a virtual obstacle on the first movement trajectory; and transmitting, to a server, synchronization information comprising the collision information and the movement information, the synchronization information being used for instructing the server to correct a second movement trajectory according to the collision information and the movement information, the second movement trajectory being a movement trajectory of the virtual prop acquired by the server.

20 Claims, 10 Drawing Sheets

(56) References Cited

U.S. PATENT DOCUMENTS

| | | | |
|---|---|---|---|
| 2017/0148256 A1* | 5/2017 | Surmacz | G07F 17/3295 |
| 2018/0082535 A1* | 3/2018 | Filipour | G07F 17/3209 |
| 2020/0005587 A1* | 1/2020 | Hartl | G07F 17/3286 |
| 2023/0033885 A1* | 2/2023 | Khamis | A63B 63/08 |
| 2023/0124014 A1* | 4/2023 | Liu | A63F 13/837 |
| | | | 463/31 |

FOREIGN PATENT DOCUMENTS

| | | |
|---|---|---|
| CN | 108786108 A | 11/2018 |
| CN | 111475573 A | 7/2020 |

\* cited by examiner

DATA SYNCHRONIZATION METHOD AND APPARATUS, TERMINAL, SERVER, AND STORAGE MEDIUM

RELATED APPLICATION

This application is a continuation application of PCT Patent Application No. PCT/CN2021/077446, filed on Feb. 23, 2021, which claims priority to Chinese Patent Application No. 202010268946.1, filed with the National Intellectual Property Administration, PRC on Apr. 8, 2020, each of which is incorporated by reference in its entirety.

FIELD OF THE TECHNOLOGY

This application relates to the technical field of computers, and in particular, to a data synchronization method and apparatus, a terminal, a server, and a storage medium.

BACKGROUND OF THE DISCLOSURE

With the development of multimedia technologies and diversification of terminal functions, more and more types of games can be played on a terminal. The shooting game is a popular game. The terminal may display a virtual scene in an interface and display a virtual object in the virtual scene. The virtual object may control a virtual prop to fight with other virtual objects.

Currently, by using the virtual prop with explosive power as an example, a control method for the virtual prop is usually is to throw the virtual prop to a certain location after a user clicks an interactive button. When the virtual prop falls onto the ground, the explosion effect of the virtual prop can be displayed at the drop point. In the process, the virtual prop rebounds when colliding with the virtual obstacle on the movement trajectory. The terminal and the server both calculate the movement trajectory of the virtual prop. If the calculated results are not the same, the movement trajectory and the drop point calculated by the server shall prevail, so as to display the explosion effect.

Since some virtual scenes or angles in the terminal and the server cannot be completely the same, it cannot be ensured that the movement trajectories of the virtual prop calculated by the terminal and the server are completely the same. In this way, the movement trajectory calculated by the server shall prevail. The inconsistency of the movement trajectories calculated by the terminal and the server is also likely to cause the inconsistency of the location of the finally displayed explosion effect and the drop point. For example, finally, the drop point calculated by the server shall prevail. A situation may occur during the display of the explosion effect of the virtual prop: the virtual prop falls at one location while the explosion location is at another location. As a result, the movement trajectory of the virtual prop acquired in the foregoing control method is inaccurate, which does not conform to the actual movement of the virtual prop.

SUMMARY

Embodiments of this application provide a data synchronization method and apparatus, a terminal, a server, and a storage medium, to enhance the accuracy of a movement trajectory of a virtual prop. The technical solutions are as follows:

In one aspect, a data synchronization method is provided, applicable to a terminal and including:

controlling, in response to a throwing operation on a virtual prop, the virtual prop to move in a virtual scene according to a first movement trajectory;

acquiring collision information and movement information of the virtual prop in response to a collision between the virtual prop and an obstacle on the first movement trajectory; and transmitting, to a server, synchronization information including the collision information and the movement information, the synchronization information being used for instructing the server to correct a second movement trajectory according to the collision information and the movement information, the second movement trajectory being a movement trajectory of the virtual prop acquired by the server.

In one aspect, a data synchronization method is provided, applicable to a server and including:

acquiring a second movement trajectory of a virtual prop in response to a throwing instruction on the virtual prop;

receiving synchronization information transmitted by a terminal, the synchronization information including collision information and movement information of the virtual prop and being transmitted by the terminal in a case that the virtual prop collides with a virtual obstacle on a first movement trajectory, the first movement trajectory being a movement trajectory of the virtual prop acquired by the terminal; and correcting the second movement trajectory according to the collision information and the movement information.

In one aspect, a data synchronization apparatus is provided, including:

a control module, configured to: control, in response to a throwing operation on a virtual prop, the virtual prop to move in a virtual scene according to a first movement trajectory;

an acquisition module, configured to acquire collision information and movement information of the virtual prop in response to a collision between the virtual prop and a virtual obstacle on the first movement trajectory; and a transmission module, configured to transmit, to a server, synchronization information including the collision information and the movement information, the synchronization information being used for instructing the server to correct a second movement trajectory according to the collision information and the movement information, the second movement trajectory being a movement trajectory of the virtual prop acquired by the server.

In one aspect, a data synchronization apparatus is provided, including:

an acquisition module, configured to acquire a second movement trajectory of a virtual prop in response to a throwing instruction on the virtual prop;

a receiving module, configured to receive synchronization information transmitted by a terminal, the synchronization information including collision information and movement information of the virtual prop and being transmitted by the terminal in a case that the virtual prop collides with a virtual obstacle on a first movement trajectory, the first movement trajectory being a movement trajectory of the virtual prop acquired by the terminal; and a correction module, configured to correct the second movement trajectory according to the collision information and the movement information.

In one aspect, a terminal is provided, including one or more processors and one or more memories storing at least one piece of program code, the at least one piece of program code being loaded and executed by the one or more processors to implement the data synchronization method according to any one of the foregoing aspects and any possible implementation in any one of the foregoing aspects.

In one aspect, a server is provided, including one or more processors and one or more memories storing at least one piece of program code, the at least one piece of program code being loaded and executed by the one or more processors to implement the data synchronization method according to any one of the foregoing aspects and any possible implementation in any one of the foregoing aspects.

In one aspect, a storage medium is provided, storing at least one piece of program code, the at least one piece of program code being loaded and executed by a processor to implement the data synchronization method according to any one of the foregoing aspects and any possible implementation in any one of the foregoing aspects.

In one aspect, a computer program product or a computer program is provided. The computer program product or the computer program includes computer instructions, and the computer instructions are stored in a non-transitory computer-readable storage medium. A processor of a computer device reads the computer instructions from the non-transitory computer-readable storage medium, and executes the computer instructions, so that the computer device performs the data synchronization method provided in the foregoing optional implementations of the foregoing aspects.

In the embodiments of this disclosure, in a case that the virtual prop collides with the virtual obstacle on the first movement trajectory during the movement according to the first movement trajectory, the collision information and the movement information of the virtual prop are synchronized to the server, so that the server may correct, according to the synchronized collision information and movement information, the second movement trajectory acquired by the server. In the foregoing data synchronization method, the movement trajectory of the virtual prop in the server is corrected by synchronizing the collision information and the collision-related movement information of the virtual prop, so as to be synchronized with the movement trajectory in the terminal. In this way, the movement trajectory of the virtual prop in the server is the same as that in the terminal, thereby enhancing the accuracy of the movement trajectory of the virtual prop. In addition, the movement trajectories obtained by the server and the terminal are the same, and drop points calculated by using the same movement trajectory are also the same. In this way, the release effect of the virtual prop can be displayed at the drop point.

BRIEF DESCRIPTION OF THE DRAWINGS

To describe technical solutions in embodiments of this disclosure more clearly, the following briefly introduces accompanying drawings required for describing the embodiments. Apparently, the accompanying drawings in the following description show merely some embodiments of this disclosure, and a person of ordinary skill in the art may still derive other accompanying drawings according to the accompanying drawings without creative efforts.

DESCRIPTION OF EMBODIMENTS

Figure 1:
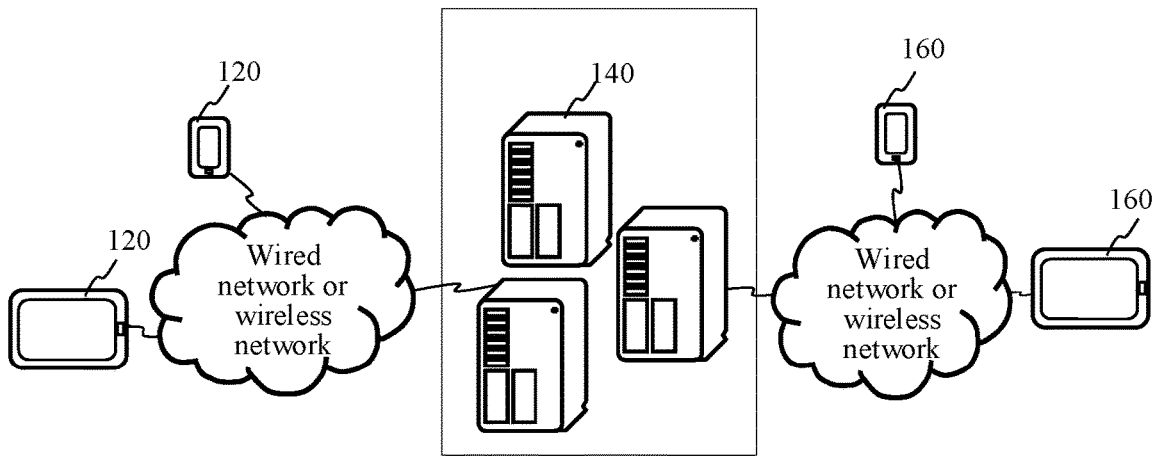
FIG. 1 is a schematic diagram of an exemplary implementation environment of a data synchronization method according to an embodiment of this disclosure.

To make objectives, technical solutions, and advantages of this application clearer, the following further describes implementations of this application in detail with reference to the accompanying drawings.

The terms "first", "second", and the like in this application are used for distinguishing between same items or similar items of which effects and functions are basically the same. It is to be understood that, the "first", "second", and "nth" do not have a dependency relationship in logic or time sequence, and a quantity and an execution order thereof are not limited.

The term "at least one" in this application means one or more and "at least two" means two or more. For example, at least two devices means two or more devices.

Terms used in this application are explained in the following.

Virtual scene: a virtual scene displayed (or provided) when an application program is run on a terminal. The virtual scene may be a simulation environment of a real world, may also be a semi-simulation and semi-fiction virtual environment, and may further be a pure fiction virtual environment. The virtual scene may be any one of a two-dimensional virtual scene, a 2.5-dimensional virtual scene, or a three-dimensional virtual scene, and the dimensions of the virtual scene are not limited in the embodiments of this disclosure. For example, the virtual scene may include the sky, the land, the ocean, or the like. The land may include environmental elements such as the desert and a city. A user may control the virtual object to move in the virtual scene.

Virtual object: a movable object in a virtual scene. The movable object may be a virtual character, a virtual animal, a cartoon character, or the like, for example, a character, an animal, a plant, an oil drum, a wall, or a stone displayed in a virtual scene. The virtual object may be a virtual image used for representing the user in the virtual scene. The virtual scene may include a plurality of virtual objects, and each virtual object has a shape and a volume in the virtual scene, and occupies some space in the virtual scene.

Optionally, the virtual object may be a player character controlled by operations on a client, or may be an artificial intelligence (AI) set in a virtual scene battle through training, or a non-player character (NPC) set in a virtual scene interaction. Optionally, the virtual object may be a virtual character competing in a virtual scene. The quantity of virtual objects participating in the interaction in the virtual scene may be preset, or may be dynamically determined according to the quantity of clients participating in the interaction.

For example, in a shooting game, the user may control the virtual object to descend freely, glide, parachute, or the like in the sky of the virtual scene, or run, jump, crawl, stoop to move forward, or the like on the land, or swim, float, dive, or the like in the ocean. Certainly, the user may alternatively control the virtual object to drive a virtual vehicle to move in the virtual scene. For example, the virtual vehicle may be a virtual car, a virtual aircraft, a virtual yacht, and the like. Herein, the foregoing scene is merely used as an example for description, which is not specifically limited in the embodiments of this disclosure. The user may also control the virtual object to interact, such as fight, with other virtual objects by using virtual props. For example, the virtual props may be throwing props such as grenades, cluster munitions, smoke grenades, stun grenades, frangible grenades, sticky grenades (referred to as "SG" for short), or the like, or may be shooting props such as machine guns, pistols, rifles, and the like. A type of the virtual prop is not specifically limited in this application.

FIG. 1 is a schematic diagram of an implementation environment of a data synchronization method according to an embodiment of this disclosure. Referring to FIG. 1, the implementation environment includes a first terminal 120, a server 140, and a second terminal 160.

An application program supporting a virtual scene is installed and run on the first terminal 120. The application program may be any one of a first-person shooter (FPS) game, a third-person shooter (TPS) game, a multiplayer online battle arena (MOBA) game, a virtual reality application program, a three-dimensional map program, a military simulation program, or a multiplayer gunfight survival game. The first terminal 120 may be a terminal used by a first user, and the first user uses the first terminal 120 to operate a first virtual object in the virtual scene to perform a movement. The movement includes, but is not limited to, at least one of body posture adjustment, crawling, walking, running, cycling, jumping, driving, picking-up, shooting, attacking, and throwing. For example, the first virtual object is a first virtual person, such as a simulated person role or a cartoon person role. For example, the first virtual object may be a first virtual animal, such as a simulated monkey or another animal.

The first terminal 120 and the second terminal 160 are connected to the server 140 by using a wireless network or a wired network.

The server 140 may include at least one of one server, a plurality of servers, a cloud computing platform, or a virtualization center. The server 140 is configured to provide a backend service for an application program supporting a virtual scene. Optionally, the server 140 may take on primary computing work, and the first terminal 120 and the second terminal 160 may take on secondary computing work; alternatively, the server 140 takes on secondary computing work, and the first terminal 120 and the second terminal 160 take on primary computing work; alternatively, collaborative computing is performed by using a distributed computing architecture among the server 140, the first terminal 120, and the second terminal 160.

For example, the first terminal 120 and the second terminal 160 may transmit generated data to the server 140, and the server 140 may verify data generated by the server 140 and the data generated by the terminal. If it is inconsistent with the data indicated by a verification result of any terminal, the data generated by the server may be transmitted to any terminal, and the any terminal is subject to the data generated by the server.

An application program supporting a virtual scene is installed and run on the second terminal 160. The application may include an FPS game, a TPS game, a MOBA game, a virtual reality application program, a three-dimensional map program, a military simulation program, or a multiplayer gunfight survival game. The second terminal 160 may be a terminal used by a second user, and the second user uses the second terminal 160 to operate a second virtual object in the virtual scene to perform a movement. The movement includes, but is not limited to, at least one of body posture adjustment, crawling, walking, running, cycling, jumping, driving, picking-up, shooting, attacking, and throwing. For example, the second virtual object is a second virtual person, such as a simulated person role or a cartoon person role. For example, the second virtual object may be a second virtual animal, such as a simulated monkey or another animal.

Optionally, the first virtual object controlled by the terminal 120 and the second virtual object controlled by the terminal 160 are located in the same virtual scene, and in this case, the first virtual object may interact with the second virtual object in the virtual scene. In some embodiments, the first virtual object and the second virtual object may be in a hostile relationship, for example, the first virtual object and the second virtual object may belong to different teams and organizations. The virtual objects in the hostile relationship may interact with each other in battle by shooting each other on the land.

In some other embodiments, the first virtual object and the second virtual object may be in a teammate relationship, for example, the first virtual object and the second virtual object may belong to the same team or the same organization, have a friend relationship, or have a temporary communication permission.

Optionally, the application programs installed on the first terminal 120 and the second terminal 160 are the same, or the application programs installed on the two terminals are the same type of application programs in different operating system platforms. The first terminal 120 may be generally one of a plurality of terminals, and the second terminal 160 may be generally one of a plurality of terminals. In this embodiment, only the first terminal 120 and the second terminal 160 are used as examples for description. Terminal types of the first terminal 120 and the second terminal 160 are the same or different. The terminal type includes at least one of a smartphone, a tablet computer, an ebook reader, a moving picture experts group audio layer III (MP3) player, a moving picture experts group audio layer IV (MP4) player, a laptop computer, or a desktop computer. For example, the first terminal 120 and the second terminal 160 may be the smartphone or another hand-held portable game device. The following embodiment is described by using an example that the terminal includes a smartphone.

A person skilled in the art may learn that there may be more or fewer terminals. For example, there may be only one terminal, or there may be tens of or hundreds of or more terminals. The quantity and the device type of the terminals are not limited in the embodiments of this disclosure.

Figure 2:
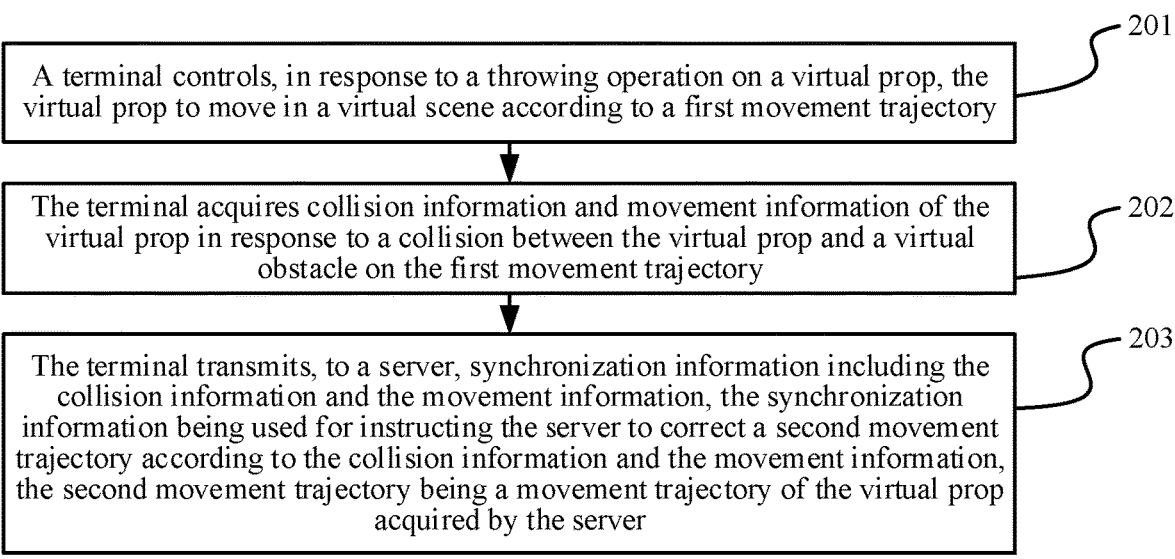
FIG. 2 is a flowchart of an exemplary data synchronization method according to an embodiment of this disclosure.

FIG. 2 is a flowchart of a data synchronization method according to an embodiment of this disclosure. Referring to FIG. 2, the method may include the following steps.

201: A terminal controls, in response to a throwing operation on a virtual prop, the virtual prop to move in a virtual scene according to a first movement trajectory.

The virtual prop is a prop that can interact with a virtual object. A user may operate on the terminal to control the virtual object to use or control the virtual prop in the virtual scene. In the embodiment of this disclosure, the user may perform a throwing operation. The terminal can acquire, in response to the throwing operation, a first movement trajectory of the virtual prop and control the virtual object to throw the virtual prop when detecting the throwing operation, so that the virtual prop can move according to the first movement trajectory.

An initial throwing angle, an initial throwing direction, and an initial throwing strength corresponding to the first movement trajectory are manually adjusted by the user by using the throwing operation.

For example, the virtual prop may be throwing props such as grenades, cluster munitions, smoke grenades, stun grenades, frangible grenades, sticky grenades, or the like. A type of the virtual prop is not specifically limited in the embodiments of this disclosure. By using the grenades as an example, the user may select the grenade, press a throwing button, and release the throwing button in a case that a proper throwing angle is adjusted. The terminal may control the virtual object to throw the grenade according to the current throwing angle. In this way, the grenade can fly through the air according to the first movement trajectory corresponding to the current throwing angle.

202: The terminal acquires collision information and movement information of the virtual prop in response to a collision between the virtual prop and a virtual obstacle on the first movement trajectory.

The virtual obstacle may exist on the first movement trajectory. In a case that the virtual prop collides with the virtual obstacle, the virtual prop rebounds and changes a movement trajectory. The virtual obstacle may be the virtual object in the virtual scene. For example, the obstacle may be a wall, a box, a vehicle, or the like, or may be the virtual object in the virtual scene. Alternatively, the virtual obstacle may be fixedly set in a virtual environment. Alternatively, the virtual obstacle may be movable in the virtual environment.

The collision information is used for indicating related information of a current collision, for example, collision location information, the collision location information and type information of the virtual obstacle, or the like. The movement information of the virtual prop may be the movement information of the virtual prop when the collision occurs, during the collision or after the collision, which is not limited in the embodiments of this disclosure.

Optionally, the movement information of the virtual prop may be used for indicating a movement situation of the virtual prop. For example, the movement information may be movement velocity information of the virtual prop. The movement velocity information may be a movement velocity during the collision of the virtual props, or may be a movement velocity after the collision, which is not limited in the embodiment of this disclosure. The movement velocity information is represented by a vector (including a velocity magnitude and a direction).

It may be understood that, the first movement trajectory of the virtual prop after the collision can be determined based on the collision information and the movement information, so as to control the virtual prop to continuously move according to the first movement trajectory. Definitely, after the first movement trajectory after the collision is learned, a location of the virtual prop during releasing can also be determined. Therefore, the virtual prop may be controlled to release at the location.

203: The terminal transmits, to a server, synchronization information including the collision information and the movement information, the synchronization information being used for instructing the server to correct a second movement trajectory according to the collision information and the movement information, the second movement trajectory being a movement trajectory of the virtual prop acquired by the server.

The first movement trajectory is determined by the terminal. The second movement trajectory is determined by the server. Since some virtual scenes or angles in the server and the terminal cannot be completely the same, the first movement trajectory and the second movement trajectory may be different from each other.

In the embodiments of this disclosure, in a case that the virtual prop collides with the virtual obstacle, the terminal can acquire and synchronize the collision information and the movement information of the virtual prop to the server, to inform the related information of the current collision. Then the server may correct, based on the collision-related information synchronized by the terminal, the second movement trajectory acquired the server. The corrected second movement trajectory is the same as the first movement trajectory in the terminal.

In addition, by using the foregoing steps, the movement trajectory of the virtual prop in the terminal is the same as that in the server. A release location of the virtual prop is determined by using the same movement trajectory, that is, a target release location. Results acquired by the server and the terminal are the same. Since the information synchronization during the collision between the terminal and the server corrects the second movement trajectory in the server, the target release locations subsequently acquired are also the same. The virtual prop can be released at a real location of the virtual prop, thereby improving the accuracy of the display location of the release effect.

Figure 3:
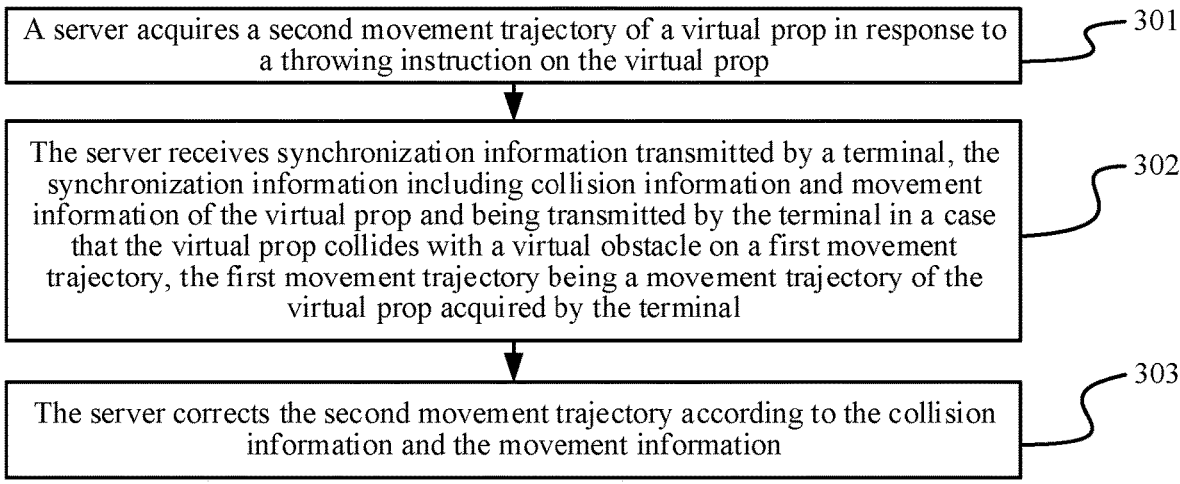
FIG. 3 is a flowchart of another exemplary data synchronization method according to an embodiment of this disclosure.

In the embodiments of this disclosure, in a case that the virtual prop collides with the virtual obstacle on the first movement trajectory during the movement according to the first movement trajectory, the collision information and the movement information of the virtual prop are synchronized to the server, so that the server may correct, according to the synchronized collision information and movement information, the second movement trajectory acquired by the server. In the foregoing data synchronization method, the movement trajectory of the virtual prop in the server is corrected by synchronizing the collision information and the collision-related movement information of the virtual prop, so as to be synchronized with the movement trajectory in the terminal. In this way, the movement trajectory of the virtual prop in the server is the same as that in the terminal, thereby enhancing the accuracy of the movement trajectory of the virtual prop. In addition, the movement trajectories obtained by the server and the terminal are the same, and drop points calculated by using the same movement trajectory are also the same. In this way, the release effect of the virtual prop can be displayed at the drop point. FIG. 3 is a flowchart of a data synchronization method according to an embodiment of this disclosure. Referring to FIG. 3, the method may include the following steps.

301: A server acquires a second movement trajectory of a virtual prop in response to a throwing instruction on the virtual prop.

The throwing instruction may be transmitted by a terminal in response to the throwing operation on the virtual prop. For example, a user may perform the throwing operation on the terminal. The terminal may transmit the throwing instruction to the server in response to the throwing operation when detecting the throwing operation, to notify the server that the virtual prop is thrown. The server may acquire the second movement trajectory of the virtual prop after receiving the throwing instruction.

In a possible implementation, the throwing instruction may include throwing parameters such as a location where the virtual prop is thrown, a throwing angle, a throwing direction, a throwing strength, and the like. The server may also extract the throwing parameters from the throwing instruction, so as to determine the second movement trajectory according to the throwing parameters. A process of acquiring the second movement trajectory is similar to a process of acquiring the first movement trajectory by the terminal in step 201, and the details are not described herein again.

302: The server receives synchronization information transmitted by a terminal, the synchronization information including collision information and movement information of the virtual prop and being transmitted by the terminal in a case that the virtual prop collides with a virtual obstacle on a first movement trajectory, the first movement trajectory being a movement trajectory of the virtual prop acquired by the terminal.

In the terminal, the virtual prop moves according to the first movement trajectory. The virtual prop may collide with the virtual obstacle on the first movement trajectory. In a case that the collision occurs, the terminal can perform steps 202 and 203. The synchronization information including the collision information and the movement information of the virtual prop is transmitted to the server, thereby implementing the synchronization of the collision-related information. In this way, the server can receive the collision information and the movement information. The second movement trajectory after the collision of the virtual prop is determined according to the collision information and the movement information. The second movement trajectory determined according to the collision information and the movement information may be different from the second movement trajectory in step 301. Therefore, step 303 may be performed to use, as a correction basis of the second movement trajectory, the synchronization information transmitted by the terminal.

In a possible implementation, the server may also determine, according to the second movement trajectory and the virtual scene after performing step 301, whether the second movement trajectory includes the virtual obstacle. In turn, it can be determined whether the virtual prop collides with the virtual obstacle on the second movement trajectory, and the collision information and the movement information are acquired in a case that it is determined that the collision occurs.

In the implementation, the server may compare, with the collision information and the movement information acquired by the server, the collision information and the movement information synchronized by the terminal, to determine whether the collision information and the movement information synchronized by the terminal and the collision information and the movement information acquired by the server are the same. If so, the server may not perform step 303 below, and directly acquire the second movement trajectory after the collision according to the collision information and the movement information. If not, step 303 is then performed to re-determine the second movement trajectory, so as to correct the original second movement trajectory.

The server may further update the collision information and the movement information acquired by the server. In this way, the collision information and the movement information of the virtual prop in the terminal and the server are the same. The movement trajectories of the virtual props are also the same. Therefore, the target release locations determined subsequently according to the movement trajectories are also the same.

303: The server corrects the second movement trajectory according to the collision information and the movement information.

By using the foregoing steps, the server receives the collision information and the movement information synchronized by the terminal. The movement trajectory of the virtual prop after the collision may be determined according to the collision information and the movement information, that is, the second movement trajectory is corrected. The second movement trajectory is corrected based on the collision information and the movement information synchronized by the terminal. In this way, the collision information and the movement information of the virtual prop in the terminal and the server are the same. Correspondingly, the first movement trajectory and the second movement trajectory of the virtual prop are also the same. Therefore, the target release locations subsequently determined by using the movement trajectories are also the same.

In a possible implementation, after the data synchronization by using the method provided in the embodiments of this disclosure, the server may determine the target release location based on the corrected second movement trajectory. Since the first movement trajectory and the second movement trajectory are the same, the virtual prop can move to the target release location according to the first movement trajectory. In this way, the terminal may display a release effect according to the target release location. A location of displaying the release effect is the same as the location where the virtual prop is located, so as to ensure the accuracy of displaying the release effect, and the virtual prop can be released at the drop point.

In a possible implementation, the virtual prop may collide with a plurality of virtual obstacles during the movement according to the first movement trajectory. The terminal may synchronize the collision information and the movement information to the server after each collision. The server may correct the second movement trajectory of the virtual prop according to the collision information and the movement information synchronized by the terminal. In this way, the second movement trajectory of the virtual prop in the server and the terminal is the same as the first movement trajectory. Specifically, a process of correcting the second movement trajectory every time is similar to that in step 303. The number of collisions is not limited in the embodiment of this disclosure.

In the embodiments of this disclosure, after the virtual prop is thrown, the server may acquire the second movement trajectory of the virtual prop. In a case that the virtual prop collides with the virtual obstacle during the movement, the terminal may synchronize the collision information and the movement information of the virtual prop to the server, so that the server may correct, according to the synchronized collision information and movement information, the second movement trajectory acquired by the server. In the data synchronization method, the movement trajectory of the virtual prop in the server is corrected by receiving the collision-related information synchronized by the terminal, so as to be synchronized with the movement trajectory in the terminal. In this way, the movement trajectory of the virtual prop in the server is the same as that in the terminal, thereby enhancing the accuracy of the movement trajectory of the virtual prop. In addition, the movement trajectories obtained by the server and the terminal are the same, and drop points calculated by using the same movement trajectory are also the same. In this way, an explosion effect can be displayed at the drop point.

Figure 4:
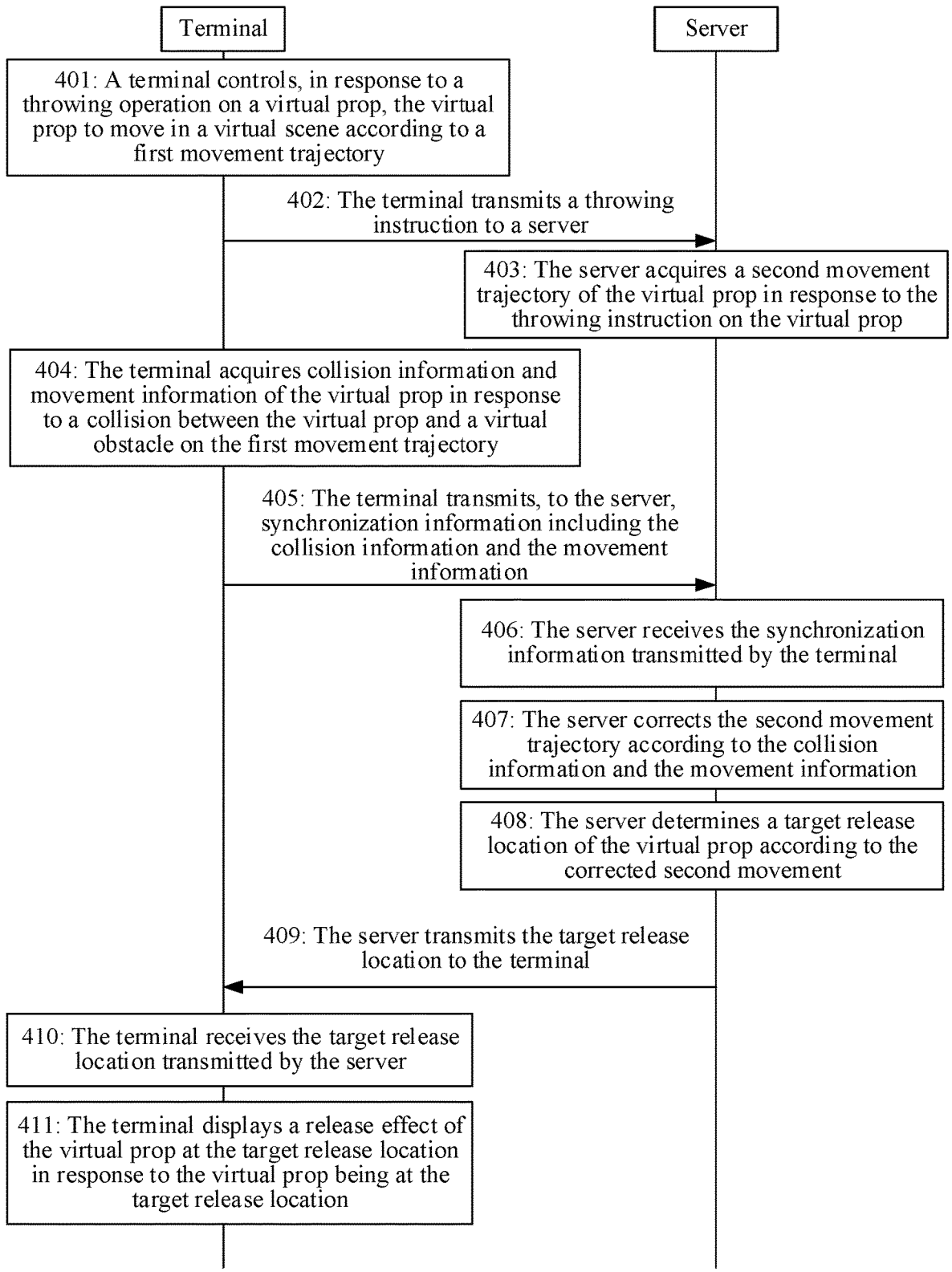
FIG. 4 is a flowchart of another exemplary data synchronization method according to an embodiment of this disclosure.

FIG. 4 is a flowchart of a data synchronization method according to an embodiment of this disclosure. In this embodiment, the process of two methods is described in the form of interaction between the terminal and the server. Referring to FIG. 4, the method may include the following steps:

401: A terminal controls, in response to a throwing operation on a virtual prop, the virtual prop to move in a virtual scene according to a first movement trajectory.

A user may acquire the virtual prop by operating and controlling a virtual object. The terminal may display the virtual prop at a corresponding location of the virtual object in the virtual scene. For example, the virtual prop is a grenade. The user may acquire the grenade by controlling the virtual object. The terminal may display the grenade around the waist of the virtual object.

The virtual prop may include two acquisition manners, specifically as follows.

Acquisition manner I: The virtual object obtains the virtual prop by picking.

In the acquisition manner I, the terminal may display a plurality of virtual props in the virtual scene. The plurality of virtual props may include throwing virtual props, remote virtual props, close-range virtual props, supplement props, and the like. The throwing virtual props may be the virtual props used by the virtual object through throwing, for example, grenades, smoke grenades, frangible grenades, and the like.

Specifically, the virtual prop may be displayed on the ground of the virtual scene or the virtual item. In a case that a distance between the virtual object corresponding to the terminal and the virtual prop is less than a target threshold (for example, 1 m), the terminal displays a pickup option of the virtual prop on an upper layer of a virtual environment picture. In a case that a trigger operation for the pickup option is detected, the terminal may control the virtual object to pick up the virtual prop. Upon the completion of pickup of the virtual props, the virtual prop is displayed at a target part of the virtual object in the virtual scene, thereby indicating that the virtual object is equipped with the virtual prop.

The target part may be hands, shoulders, the back, or the like, which is not limited in the embodiment of this disclosure, the target threshold may be preset by a person skilled in the related art according to requirements, which is not limited in this embodiment of this disclosure.

Acquisition manner II: The virtual object obtains the virtual prop by calling.

In the acquisition manner II, the terminal may display a call control. In a case that the user is to call the virtual prop, a trigger operation may be performed on the call control. Then the terminal receives a trigger signal of the call control to generate a creation instruction, so as to create the virtual prop in response to the creation instruction. The call control is configured to call the virtual prop to enter the virtual scene. The form of the call control may be a button displayed on the upper layer of the virtual environment picture.

For the virtual prop, the user may control, by means of operations, the virtual object to use the virtual prop. In a possible implementation, the terminal may further display a trigger control of the virtual prop on a graphical user interface. The trigger control is configured to detect a throwing operation of the user to control the virtual object to control the throwing of the virtual prop by using a throwing control.

Figure 5:
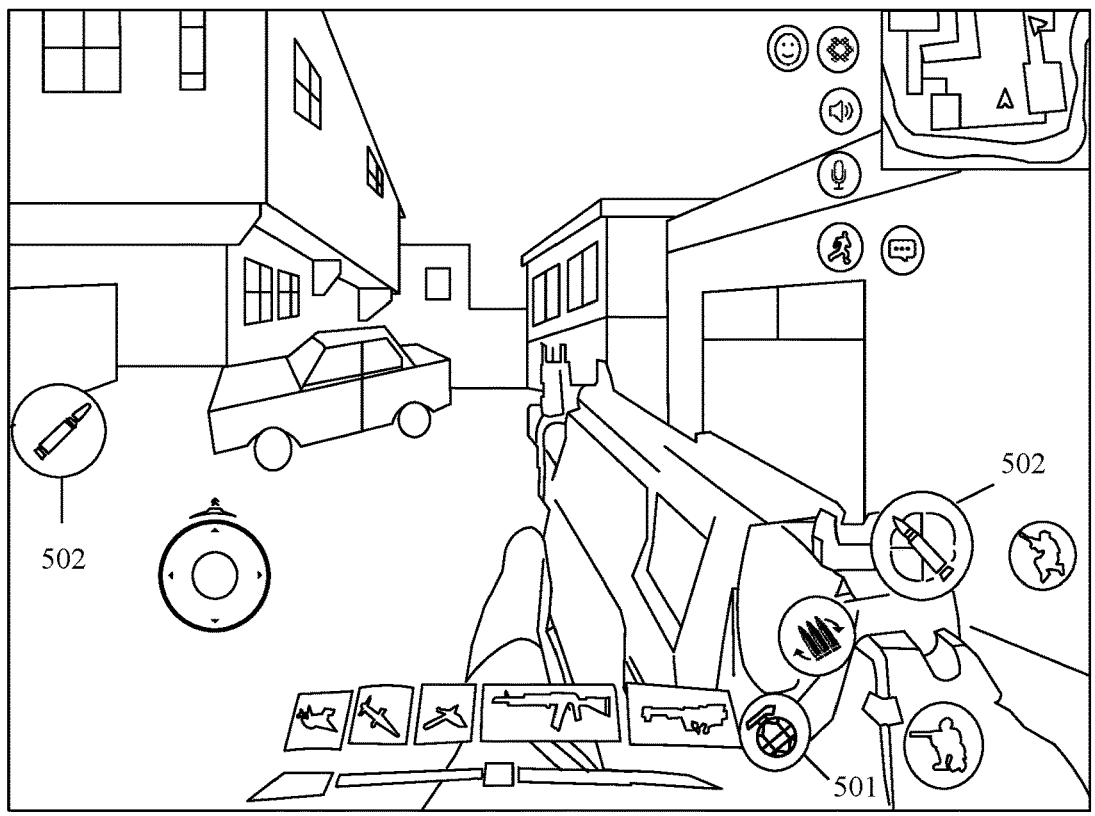
FIG. 5 is a schematic diagram of an exemplary terminal interface according to an embodiment of this disclosure.

A throwing process of the virtual prop is described by using a specific example below. As shown in FIG. 5, the terminal may display the virtual object equipped with the virtual prop in a display option 501 of the virtual prop in the graphical user interface. In a case that the user wants to use the virtual prop, the user may select the virtual prop and trigger the trigger control 502 to complete the throwing operation. A quantity of the trigger controls 502 may be one, or may be two or more than two, which is not limited in the embodiment of this disclosure.

the trigger control 502 may be a trigger control of other virtual props or a trigger control of other actions before the user selects the throwing virtual prop. For example, in a case that the user selects a firearm virtual prop, the trigger control 502 may also be referred to as a shooting control. In a case that the user does not select any virtual prop, the trigger control 502 may be a punch control. However, in a case that the user selects the throwing virtual prop, the trigger control 502 may be referred to as the throwing control.

In a possible implementation, the terminal may display the trigger control 502 according to a display style corresponding to a current state of controlling the virtual prop. For example, in a case that the trigger control 502 is the shooting control, the display style of the trigger control 502 is a bullet displayed in the center of the button. In a case that the trigger control is the throwing control, the display style of the trigger control 502 is a grenade displayed in the center of the button. In a case that the trigger control 502 is the punch control, the display style of the trigger control 502 is a first displayed in the center of the button.

In a possible implementation, in a case that the virtual prop is in a selected state, the terminal may further acquire and display a candidate movement trajectory of the virtual prop according to a viewing direction of the current virtual scene. Specifically, the terminal may determine a throwing angle of the virtual prop according to the viewing direction of the current virtual scene. The candidate movement trajectory of the virtual prop is acquired and displayed according to the throwing angle.

Figure 6:
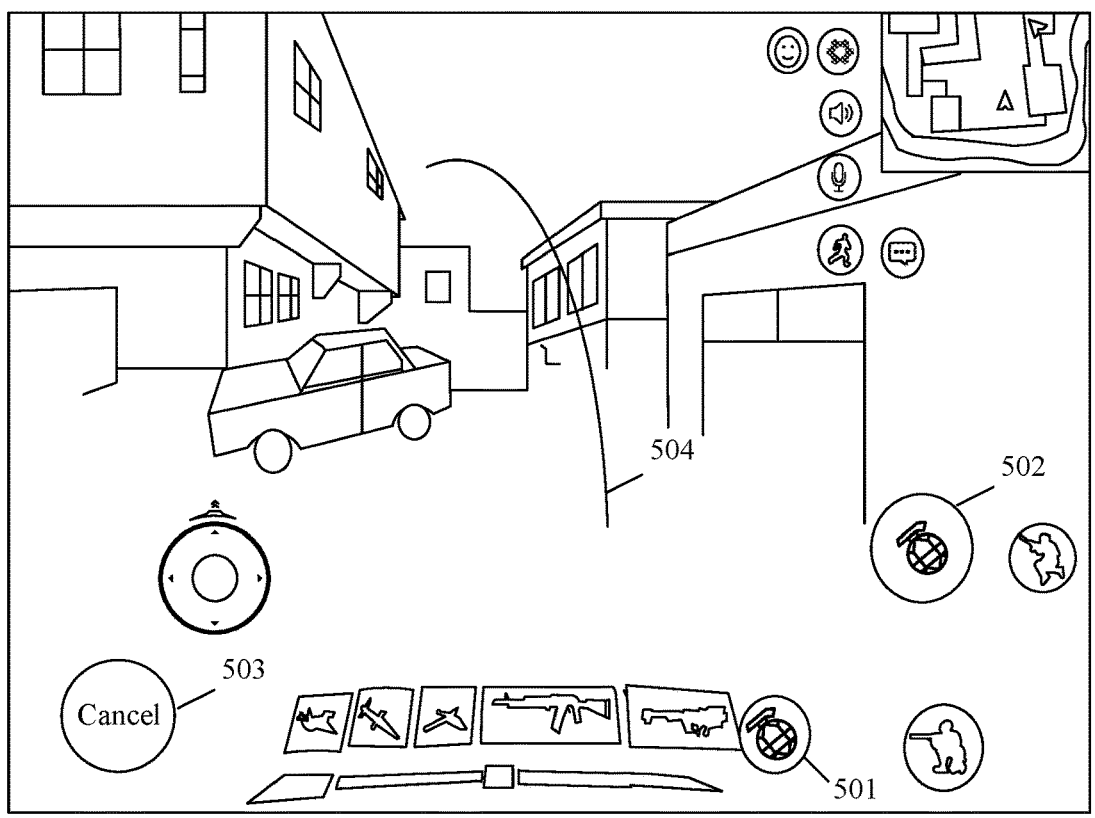
FIG. 6 is a schematic diagram of another exemplary terminal interface according to an embodiment of this disclosure.

For example, as shown in FIG. 6, the user selects the virtual prop, and the terminal may display the display option 501 of the virtual prop in a highlighted state. In a case that the terminal detects the trigger operation on the trigger control 502, the trigger operation being the throwing operation, the terminal may display the candidate movement trajectory 504 according to the throwing angle corresponding to a current viewing angle. The user may adjust the viewing angle as required. The terminal may adjust the candidate movement trajectory 504 according to the viewing angle adjustment, and stop the trigger operation on the trigger control 502 until the user is satisfied, so as to control the virtual prop to be thrown out. The candidate movement trajectory 504 in a case that the virtual prop is thrown out is the first movement trajectory. Before the user stops the trigger operation, the terminal may further display a cancel throw button 503. The user may trigger the cancel throw button 503 to stop the throwing operation.

In a possible implementation, the virtual prop may further have a fixed release time. In a case that the throwing time of the virtual prop reaches the release time, the virtual prop triggers the release effect. The throwing time refers to an elapsing period of time after the throwing operation is received, and the release times corresponding to different virtual props may be the same or different. For example, in a case that the virtual prop is a virtual smoke grenade, the release time is 4 s, and the release effect is to release smoke within a designated range. In a case that the virtual prop is a virtual flash bomb, the release time is 5 s, and the release effect is to release a flash within the designated range.

Figure 7:
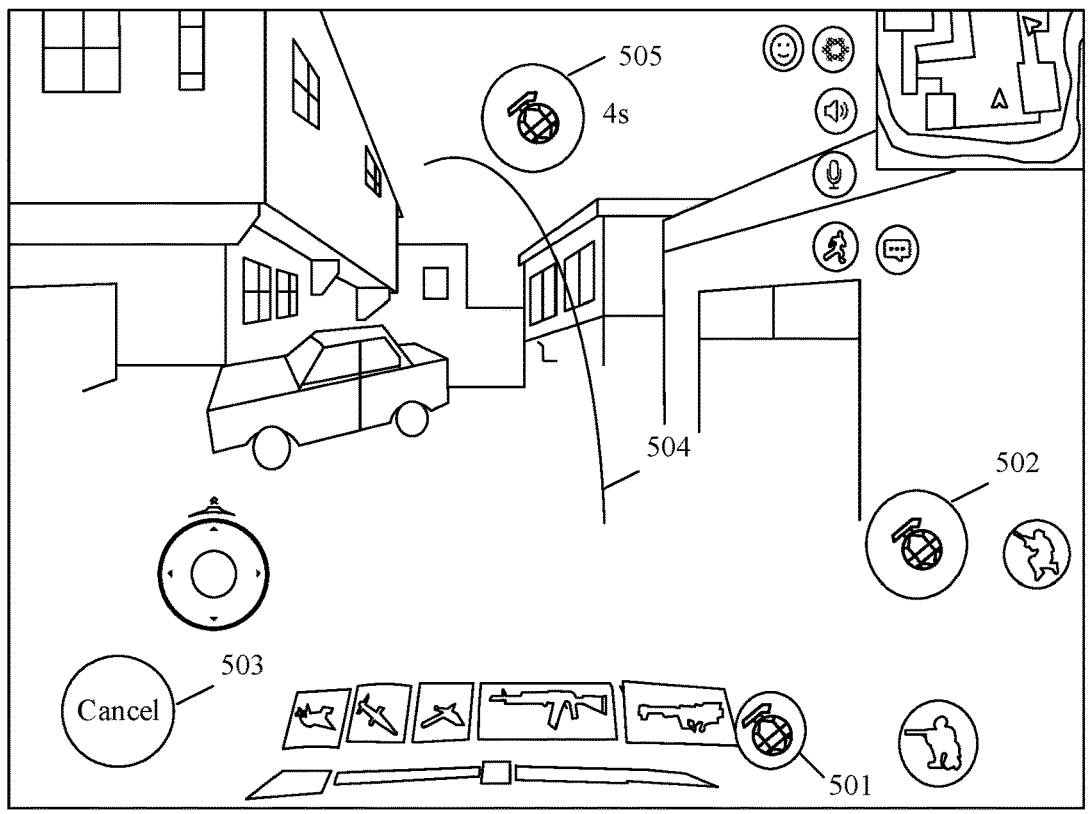
FIG. 7 is a schematic diagram of another exemplary terminal interface according to an embodiment of this disclosure.
Figure 8:
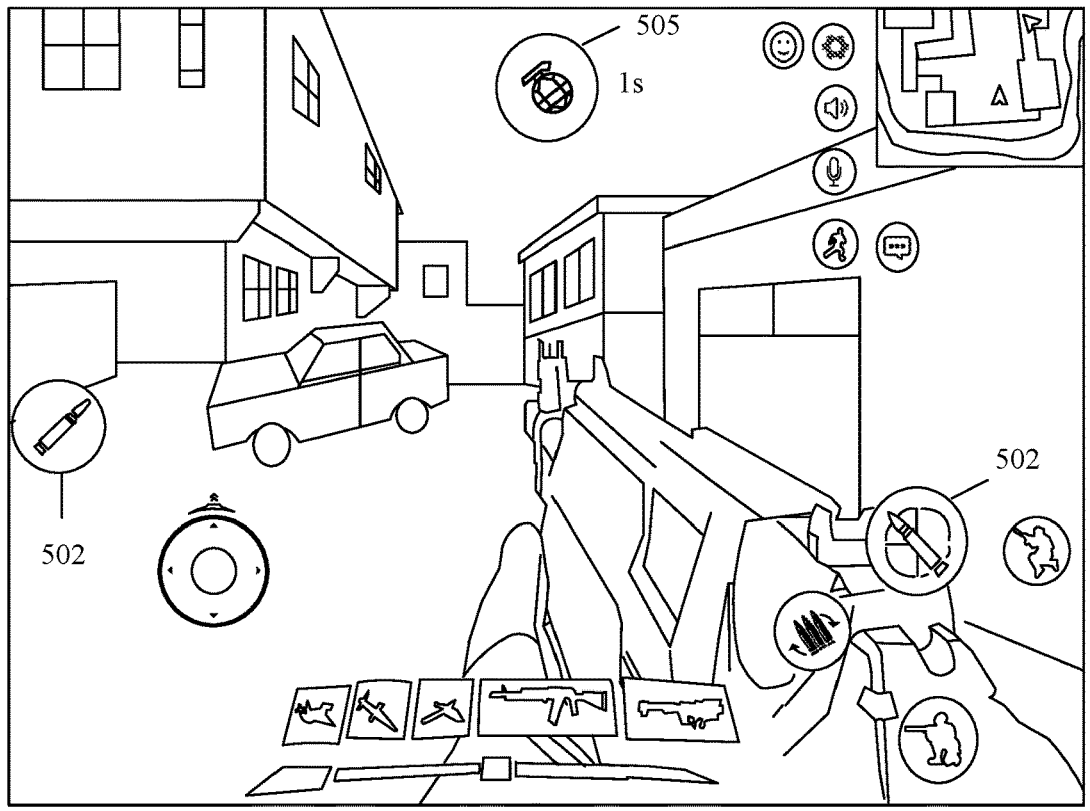
FIG. 8 is a schematic diagram of another exemplary terminal interface according to an embodiment of this disclosure.

Specifically, the terminal may further display the remaining release time of the virtual prop in the graphical user interface when detecting the trigger operation on the trigger control. For example, as shown in FIG. 7, the user may display the remaining use duration 505 in the interface after holding the trigger control 502. The remaining use duration of 4 s is used for indicating that the virtual prop is to trigger the release effect after 4 s.

in a case that the user stops holding the trigger control 502, the virtual prop is thrown out, and the terminal may further continuously display the remaining use duration 505. As shown in FIG. 8, in a case that the virtual object is equipped with one throwing virtual prop, a state of the virtual object is switched back to a state of controlling the firearm virtual prop, and the remaining use duration 505 is displayed in the interface. The remaining use duration of the throwing virtual prop is 1 s. In a case that the virtual object is equipped with a plurality of throwing virtual props, the terminal may display the virtual object in a state of using the next throwing virtual prop. This situation may be shown in FIG. 5 or FIG. 6, and the details are not described herein again.

In a possible implementation, in step 401, the terminal may further display the first movement trajectory of the virtual prop. In this way, the user can observe the movement of the virtual prop more intuitively and clearly. Specifically, the terminal may acquire and display the first movement trajectory of the virtual prop in response to the throwing operation on the virtual prop, and display the movement of the virtual prop along the first movement trajectory in the virtual scene.

402: The terminal transmits a throwing instruction to the server.

The terminal may further transmit the throwing instruction to the server in response to the throwing operation. The throwing instruction is used for informing the server of related information of the virtual prop when being thrown. Information in the throwing instruction may be used as a data basis for the server to determine the second movement trajectory of the virtual prop.

In a possible implementation, the throwing instruction may include a location and a throwing angle at which the virtual prop is thrown. The location and the throwing angle at which the virtual prop is thrown may be used for determining the first movement trajectory or the second movement trajectory of the virtual prop.

403: A server acquires a second movement trajectory of a virtual prop in response to a throwing instruction on the virtual prop.

The server may also extract the location and the throwing angle from the throwing instruction, and acquire the second movement trajectory (for example, the determined throwing angle based on the throwing angle is a parabolic trajectory of a starting point) according to the location and the throwing angle. A process of acquiring the second movement trajectory is similar to a process of acquiring the first movement trajectory by the terminal in step 201, and the details are not described herein again.

the first movement trajectory and the second movement trajectory are respectively movement trajectories of the virtual props obtained by the terminal and the server. Since some virtual scenes and angles in the terminal and the server may not be exactly the same, and the first movement trajectory and the second movement trajectory obtained by the terminal and the server may be not the same, the terminal and the server may perform step 404 to step 407 below to correct the first movement trajectory and the second movement trajectory to a same movement trajectory.

404: The terminal acquires collision information and movement information of the virtual prop in response to a collision between the virtual prop and a virtual obstacle on the first movement trajectory.

405: The terminal transmits, to the server, synchronization information including the collision information and the movement information.

In a case that the virtual prop collides with the virtual obstacle on the first movement trajectory, the terminal may acquire the collision information and the movement information of the prop to synchronize the collision information and the movement information to the server. By using step 404 and step 405, the collision information and the movement information of the virtual props in the terminal and the server are the same, and the calculated first movement trajectories are the same, so that the subsequently determined target release locations are also the same. Therefore, by using the step of synchronization, the subsequent display location of the release location of the virtual prop is accurate and has a desirable display effect.

In a possible implementation, the virtual prop may include a plurality of types. Some virtual props may rebound after colliding with the virtual obstacle, for example, the grenade, the smoke grenade, and the like. In addition, some virtual props do not rebound (that is, the virtual props have adhesive properties) after colliding with the virtual obstacle, for example, sticky grenades (grenades having adhesive properties can be adhered to a first object coming into contact with the grenades after being thrown). For the virtual props that do not rebound, a situation that the target release locations calculated by the terminal and the server are not the same will not occur. Therefore, the method may be only used in such virtual props (that is, the virtual props having no adhesive properties, or the virtual props having rebound properties) that can rebound.

In the implementation, type information of such virtual props that can rebound is a target type. The terminal may acquire the type information of the virtual prop to determine whether the type information of the currently controlled virtual prop is the target type. If so, the terminal may perform step 405. If not, the terminal does not need to perform step 405. The virtual prop belonging to the target type has no adhesive properties.

Specifically, the terminal may perform, in response to the collision between the virtual prop belonging to the target type and the virtual obstacle on the first movement trajectory, the step of transmitting the collision information and the movement information of the virtual prop to the server.

Figure 9:
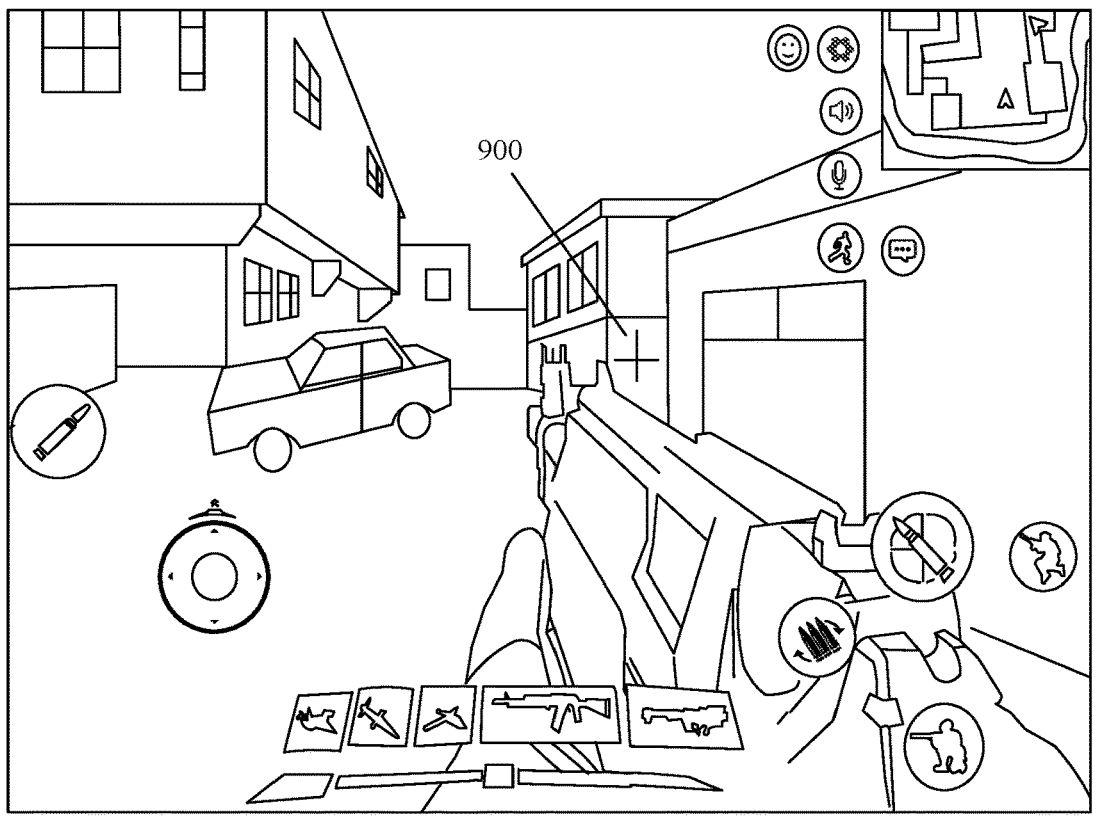
FIG. 9 is a schematic diagram of another exemplary terminal interface according to an embodiment of this disclosure.

Optionally, the terminal may also display the release effect of the virtual prop at the collision location information in response to the type information of the virtual prop not being the target type. For example, as shown in FIG. 9, the user controls the virtual object to throw a sticky grenade 900. The sticky grenade 900 is stuck to a wall after colliding with the wall in the virtual scene. The terminal may display an explosion animation at the location.

406: The server receives the synchronization information transmitted by the terminal.

407: The server corrects the second movement trajectory according to the collision information and the movement information.

The server receives the collision-related information synchronized by the terminal, and may reacquire the second movement trajectory according to the collision information and the movement information to correct the original second movement trajectory.

For the collision information, the collision information may include different information. In a possible implementation, the collision information may include the collision location information. It may be understood that, the virtual prop starts from the collision location to continuously move in a certain direction after the collision. Therefore, a starting point of the movement after the collision of the virtual prop can be synchronized by synchronizing the collision location information.

In another possible implementation, in addition to the collision location information, the collision information may further include other information, for example, type information of the virtual obstacle. In the implementation, the virtual obstacles having different type information have different rebound coefficients. The rebound coefficient of the virtual prop during the rebounding may be determined by synchronizing the type information of the virtual obstacle, so that a velocity after the rebounding may be calculated based on the rebound coefficient.

For the movement information, the movement information may be movement velocity information of the virtual prop during a collision, or may be movement velocity information of the virtual prop after the collision. The movement velocity information may be a movement velocity. The two movement velocities are both a vector, including both a magnitude and a direction. The movement velocity information after the collision may be calculated by using the movement velocity information and the collision location information during the collision. The second movement trajectory after the collision may also be calculated by using the movement velocity information and the collision location information after the collision. The embodiments of this disclosure do not limit the specific information type of the collision information and the movement information.

In view of different collision information and different movement information, three possible situations for determining the second movement trajectory are provided below.

Situation I: The collision information includes the collision location information, and the movement information includes the movement velocity information of the virtual prop during the collision. Optionally, in response to the collision between the virtual prop and the virtual obstacle on the first movement trajectory, the terminal acquires the collision location information and the movement velocity information of the virtual prop during the collision, uses the collision location information as the collision information, and uses the movement velocity information of the virtual prop during the collision as the movement information.

Correspondingly, the process of determining the second movement trajectory may be as follows. The server acquires the movement velocity information of the virtual prop after the collision according to the collision location information and the movement velocity information of the virtual prop during the collision. A collision location indicated by the collision location information is used as a starting point, and the movement velocity information after the collision as initial movement velocity information. The second movement trajectory of the virtual prop after the collision is acquired.

In the situation I, the information synchronized by the terminal to the server is the information during the collision. The server needs to acquire the information of the virtual prop after the collision according to the information during the collision. It may be understood that the collision location information is a starting point of the second movement trajectory. The movement velocity information after the collision may be calculated based on the movement velocity information before the collision. In a case that the starting point and the initial movement velocity information are determined, the second movement trajectory may be calculated. The movement velocity information of the virtual prop after the collision may also be referred to as a rebound velocity, which reflects a movement direction and the velocity magnitude after the rebounding. Situation II: The collision information includes the collision location information and the type information of the virtual obstacle. The movement information includes the movement velocity information of the virtual prop during the collision. Correspondingly, the process of determining the second movement trajectory may be as follows. The server acquires rebound information corresponding to the virtual prop according to the type information of the obstacle, and determines the movement velocity information of the virtual prop after the collision according to the collision location information, the rebound information, and the movement velocity information of the virtual prop during the collision.

In the situation II, the virtual obstacles having different type information correspond to different rebound information. In a case that the movement velocity information before the collision is the same and the rebound information is different, the acquired movement velocity information after the collision is also different.

In a possible implementation, the rebound information may be the rebound coefficient, which is a coefficient in the calculation method for calculating the movement velocity information after the collision. In a specific possible embodiment, the type information of the virtual obstacle may include first type information and second type information. The first type information corresponds to a first rebound coefficient, and the second type information corresponds to a second rebound coefficient. Correspondingly, in the foregoing steps, the server acquires the first rebound coefficient corresponding to the first type information in response to the type information of the virtual obstacle being the first type information, and acquires the movement velocity information after the collision according to the collision location information, the first rebound coefficient, and the movement velocity information before the collision. The server uses the collision location information as the starting point, uses the movement velocity information after the collision as the initial movement velocity information, and acquires the second movement trajectory of the virtual prop after the collision.

Figure 10:
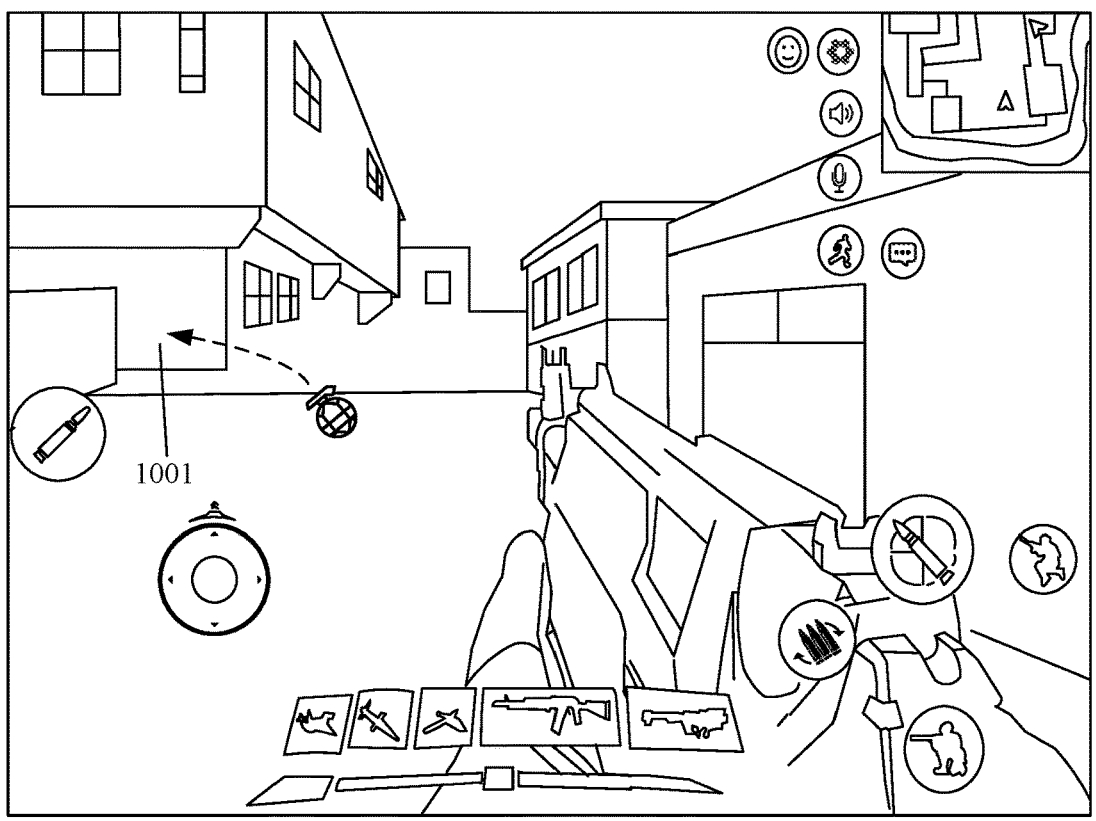
FIG. 10 is a schematic diagram of another exemplary terminal interface according to an embodiment of this disclosure.
Figure 11:
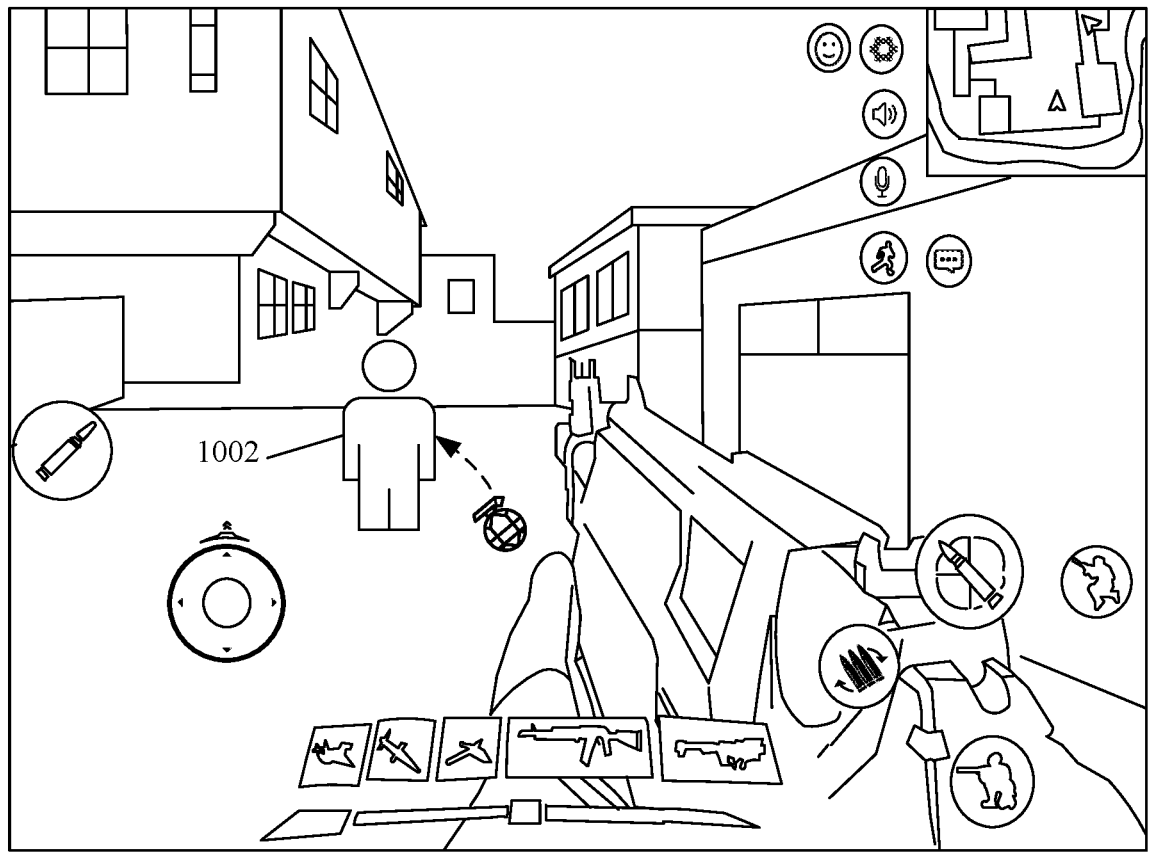
FIG. 11 is a schematic diagram of another exemplary terminal interface according to an embodiment of this disclosure.

For example, the type information of the virtual obstacle is shown in FIG. 10 and FIG. 11. The virtual obstacle having the first type information may be a virtual item 1001 in the virtual scene, for example, a wall, the ground, and the like. The virtual obstacle having the second type information may be a virtual object 1002 in the virtual scene. In a specific possible embodiment, the first rebound coefficient corresponding to the first type information may be greater than the second rebound coefficient corresponding to the second type information. Correspondingly, under a same throwing condition, the movement velocity of the virtual prop after colliding with the virtual obstacle corresponding to the first type information is greater than the movement velocity of the virtual prop after colliding with the virtual obstacle corresponding to the second type information. Definitely, other situations may also exist. For example, the first rebound coefficient is less than the second rebound coefficient, which is not limited in the embodiment of this disclosure.

Compared with the situation I, since the rebound information of the virtual obstacle is added, a rebound effect of the virtual prop after colliding with different types of virtual obstacles can be simulated, thereby improving the authenticity of the rebound effect of the virtual prop.

Situation III: The collision information includes the collision location information, and the movement information includes the movement velocity information of the virtual prop after the collision. Correspondingly, the process of determining the second movement trajectory may be as follows. The server uses the collision location information as the starting point, uses the movement velocity information of the virtual prop after the collision as the initial movement velocity information, and acquires the second movement trajectory of the virtual prop after the collision.

In the situation III, the terminal directly synchronizes the movement velocity information of the virtual prop after the collision to the server. The server may obtain the second movement trajectory by calculation according to the collision location information and the movement velocity information.

In a possible implementation, during the acquisition of the collision information and the movement information of the virtual prop, the terminal acquires the collision location information (determined as the collision information) in response to the collision between the virtual prop and the virtual obstacle on the first movement trajectory, and determines the movement velocity information (determined as the movement information) of the virtual prop after the collision based on the collision location information and the movement velocity information of the virtual prop during the collision.

Optionally, during the determination of the movement velocity information after the collision, in order to simulate a collision rebound effect of an object in the real world more realistically, the terminal acquires the rebound information corresponding to the virtual prop based on the type information of the virtual obstacle, thereby determining the movement velocity information of the virtual prop after the collision based on the collision location information, the rebound information, and the movement velocity information of the virtual prop during the collision. For the process of determining the movement velocity information after the collision by the terminal, reference may be made to the process of determining the movement velocity information after the collision by the server, and the details are not described herein again in this embodiment.

Compared with the situation I and the situation II, since the process of determining the movement velocity information after the collision is performed on a terminal side, the server only needs to determine the movement trajectory based on the collision location information and the movement velocity information. Therefore, the parallel processing pressure of the server can be reduced.

408: The server determines a target release location of the virtual prop according to the corrected second movement trajectory.

The target release location may be determined by the server based on the second movement trajectory of the virtual prop. In a possible implementation, the terminal may also determine the target release location based on the first movement trajectory of the virtual prop. The determination process is similar to the process of determining the target release location by the server, and the details are not described herein again.

In the implementation, the terminal may further compare, with the target release location determined by the server, the target release location determined by the terminal. In a case that the target release location determined by the terminal is the same as the target release location determined by the server, the terminal may perform step 411 below. In a case that the target release location determined by the terminal is not the same as the target release location determined by the server, the terminal performs step 411 based on the target release location determined by the server.

by using the foregoing step 404 and step 405, the terminal synchronizes the collision information and the movement information to the server during the collision of the virtual prop. The movement trajectories of the virtual prop determined by the terminal and the server are the same, and the information used for determining the target release locations is the same, so that the determined target release locations are also the same. Therefore, step 411 is performed based on the target release locations determined by using the foregoing method. The release effect of the virtual prop when reaching the target release location can be displayed at the target release location, and the location reached by the virtual prop is the same as the release location, thereby achieving an accurate display location and a desirable display effect.

For the process of determining the target release location, the virtual prop may include a plurality of release triggering manners. For example, the virtual prop is released when falling onto the ground. In another example, the virtual prop is released in a case that the throwing time reaches the release time. A plurality of possible implementations for determining the target release location are provided for the trigger manners below.

Manner I: The server determines a drop point of the virtual prop according to the corrected second movement trajectory and a location of the ground in the virtual scene, and determines the drop point as the target release location. In the manner I, the virtual prop is released when falling onto the ground. The target release location is the drop point of the virtual prop.

Manner II: The server determines, as the target release location according to the corrected second movement trajectory and the throwing time of the virtual prop, a location where the virtual prop on the second movement trajectory is located in a case that the throwing time reaches the release time. In the manner II, the virtual prop is released in a case that the throwing time reaches the release time. The server may time the throwing time of the virtual prop. In a case that the throwing time reaches the release time of the virtual prop, the location where the virtual prop is located is the target release location.

In the foregoing manners, the virtual prop has two trigger manners: the virtual prop is triggered when falling onto the ground, and is also triggered in a case that the throwing time reaches the release time. Therefore, the server may determine whether the virtual prop falls onto the ground first, or the release time is reached before the falling onto the ground. Once any one option is satisfied, the target release location can be determined.

In the foregoing manners, the process of determining the drop point of the virtual prop by the server may specifically include: acquiring, by the server, an intersection point of the corrected second movement trajectory and the ground in the virtual scene, and using the intersection point as the drop point of the virtual prop.

the first movement trajectory and the second movement trajectory of the virtual prop are parabolas. The terminal may detect whether the virtual prop collides with the virtual obstacle during the movement according to the first movement trajectory. The detection process may be implemented in a manner of radiographic testing.

In a possible implementation, the terminal generates a ray of a target length based on the location of the virtual prop on the first movement trajectory. A direction of the ray is a tangential direction of the location of the virtual prop on the first movement trajectory. The terminal determines, in response to the intersection between the ray and the virtual obstacle, that the virtual prop collides with the virtual obstacle.

Specifically, the virtual prop during the movement may emit the ray of the target length in the tangential direction corresponding to the location where the virtual prop on the first movement trajectory is located. In a case that the ray passes through the virtual obstacle, the virtual prop collides with the virtual obstacle. The target length may be set by relevant technical personnel according to requirements. For example, the target length may be a small value, which is 1 centimeter (cm). This is not limited in this embodiment of this disclosure.

Figure 12:
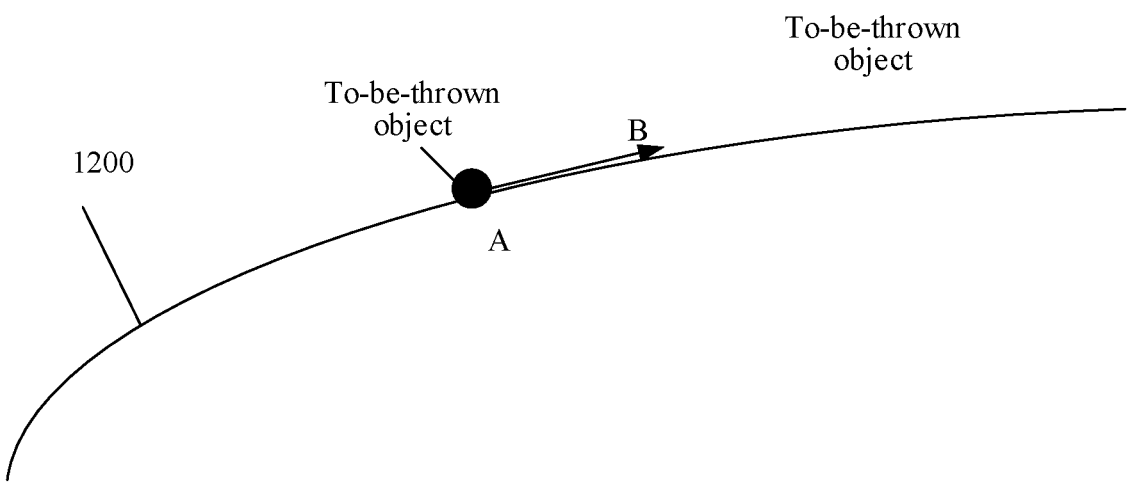
FIG. 12 is a schematic diagram showing ray detection according to an embodiment of this disclosure.

For example, as shown in FIG. 12, the virtual prop moves according to the first movement trajectory 1200. The virtual prop may emit a ray AB forward when moving to a current location. In a case that the ray AB passes through the virtual obstacle, the virtual prop collides with the virtual obstacle. In a case that the ray does not pass through the virtual obstacle, the virtual prop does not collide with the virtual obstacle.

Figure 13:
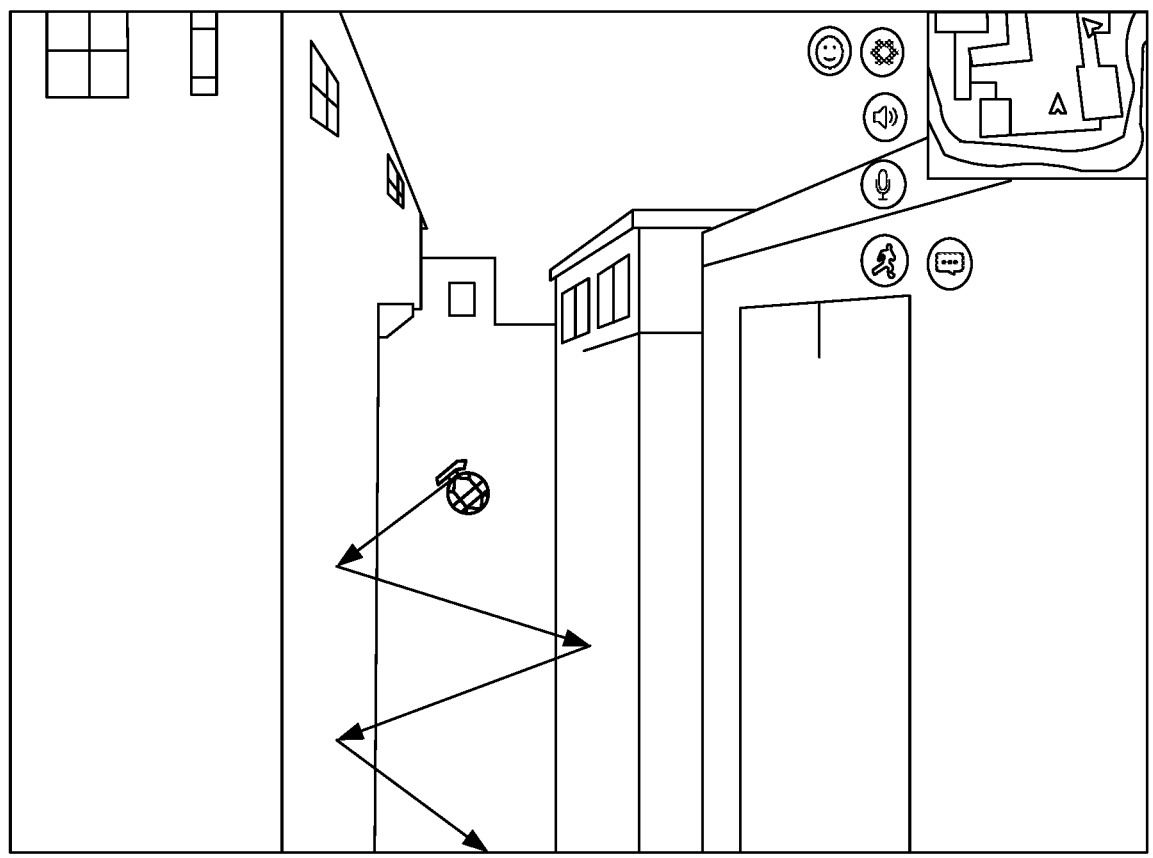
FIG. 13 is a schematic diagram of another exemplary terminal interface according to an embodiment of this disclosure.

In a possible implementation, the terminal may collide with the virtual obstacle on the first movement trajectory once, or twice, or even more than two times. That is to say, the number of times the virtual prop collides with the virtual obstacle on the first movement trajectory is at least once. As shown in FIG. 13, the virtual prop may collide with a plurality of virtual obstacles in the virtual scene a plurality of times. The virtual prop may collide with other obstacles again and rebound again after colliding with the one obstacle and rebounding.

In the implementation, the terminal may perform step 405 and transmit the collision information and the movement information to the server. The server and the terminal synchronize the collision information and the movement information during the at least one collision, thereby correcting the second movement trajectory according to the information. That is to say, the second movement trajectory is corrected based on the collision information and the movement information during the at least one collision. In this way, once the collision occurs, the terminal and the server both synchronize the collision information and the movement information, so that the movement trajectory of the virtual prop in the terminal is the same as that in the server, thereby enhancing the accuracy of the movement trajectory of the virtual prop.

409: The server transmits the target release location to the terminal.

410: The terminal receives the target release location transmitted by the server.

The target release location is determined based on the second movement trajectory. Since the second movement trajectory is determined based on the collision information and the movement information of the virtual prop that are synchronized by the terminal, it may also be understood that the target release location is determined based on the collision information and the movement information of the virtual prop that are synchronized by the terminal. For the specific determination process, reference may be made to step 408.

411: The terminal displays a release effect of the virtual prop at the target release location in response to the virtual prop being at the target release location.

The release effect of the virtual prop may be displayed in the form of animation. In a possible implementation, different virtual props correspond to different release effects. For example, in a case that the virtual prop is a grenade, the release effect may be an explosion effect. In a case that the virtual prop is a smoke grenade, the release effect may be a smoke effect. In a case that the virtual prop is a stun grenade, the release effect may be a shock effect.

The server determines the target release location, and synchronizes the determined target release location to the terminal by using step 409 and step 410. The terminal may continue to control the virtual prop to move according to the first movement trajectory until the virtual prop is located at the target release location, so as to display the release effect of the virtual prop at the target release location. In this way, the display effect seen by the user is that the virtual prop reaches a certain location and is released at the location. Therefore, the location where the virtual prop is located is the same as the display location of the release effect.

In the foregoing step, after the virtual prop collides, the terminal may continue to control the virtual prop to move according to the first movement trajectory after the collision. Since the terminal and the server synchronize the collision information and the movement information, the terminal and the server determine that the movement trajectories after the virtual prop collides are the same. The target release location determined by using the second movement trajectory is a location on the first movement trajectory. Therefore, in a process of controlling the movement of the virtual prop, in a case that the virtual prop moves to the target release location, the terminal may display the release effect at the target release location, so as to reflect the release in a case that the virtual prop moves to the location.

In a possible implementation, the release of the virtual prop may further affect other virtual items in the virtual scene. For example, in a case that the grenades explode, boxes in the virtual scene may be blown up, vehicles in the virtual scene may be detonated, and the like. In step 409, the terminal may further display, when displaying the release effect, the effect of other virtual items affected by the release of the virtual prop.

Specifically, the terminal may acquire a release range (i.e., release location range) of the virtual prop according to the target release location, and play a target animation within the release range. The target animation is used for indicating that the virtual items within the release range in the virtual scene vary with the release of the virtual prop. The use of the grenades and other weapons in a real scene is truly simulated by means of the acquisition of the release range and the playback of the target animation, thereby improving the authenticity of the release of the virtual prop in the virtual scene.

In the embodiments of this disclosure, in a case that the virtual prop collides with the obstacle on the first movement trajectory during the movement according to the first movement trajectory, the collision information and the movement information of the virtual prop are synchronized to the server, so that the server may correct, according to the synchronized collision information and movement information, the second movement trajectory acquired by the server. In the foregoing data synchronization method, the movement trajectory of the virtual prop in the server is corrected by synchronizing the collision information and the collision-related movement information of the virtual prop, so as to be synchronized with the movement trajectory in the terminal. In this way, the movement trajectory of the virtual prop in the server is the same as that in the terminal, thereby enhancing the accuracy of the movement trajectory of the virtual prop. In addition, the movement trajectories obtained by the server and the terminal are the same, and drop points calculated by using the same movement trajectory are also the same. In this way, an explosion effect can be displayed at the drop point.

In addition, in the embodiments of this disclosure, the terminal determines the rebound information based on the type information of the virtual obstacle with which the collision occurs, so as to determine the movement velocity information of the virtual prop after the collision based on the rebound information and the movement velocity information of the virtual prop during the collision. The collision location information and the movement velocity information of the virtual prop after the collision are synchronized to the server. The server corrects the second movement trajectory determined by the server. Therefore, the authenticity of collision and rebounding of the virtual prop after being thrown in the virtual scene is improved, and the parallel processing pressure of the server is reduced.

Figure 14:
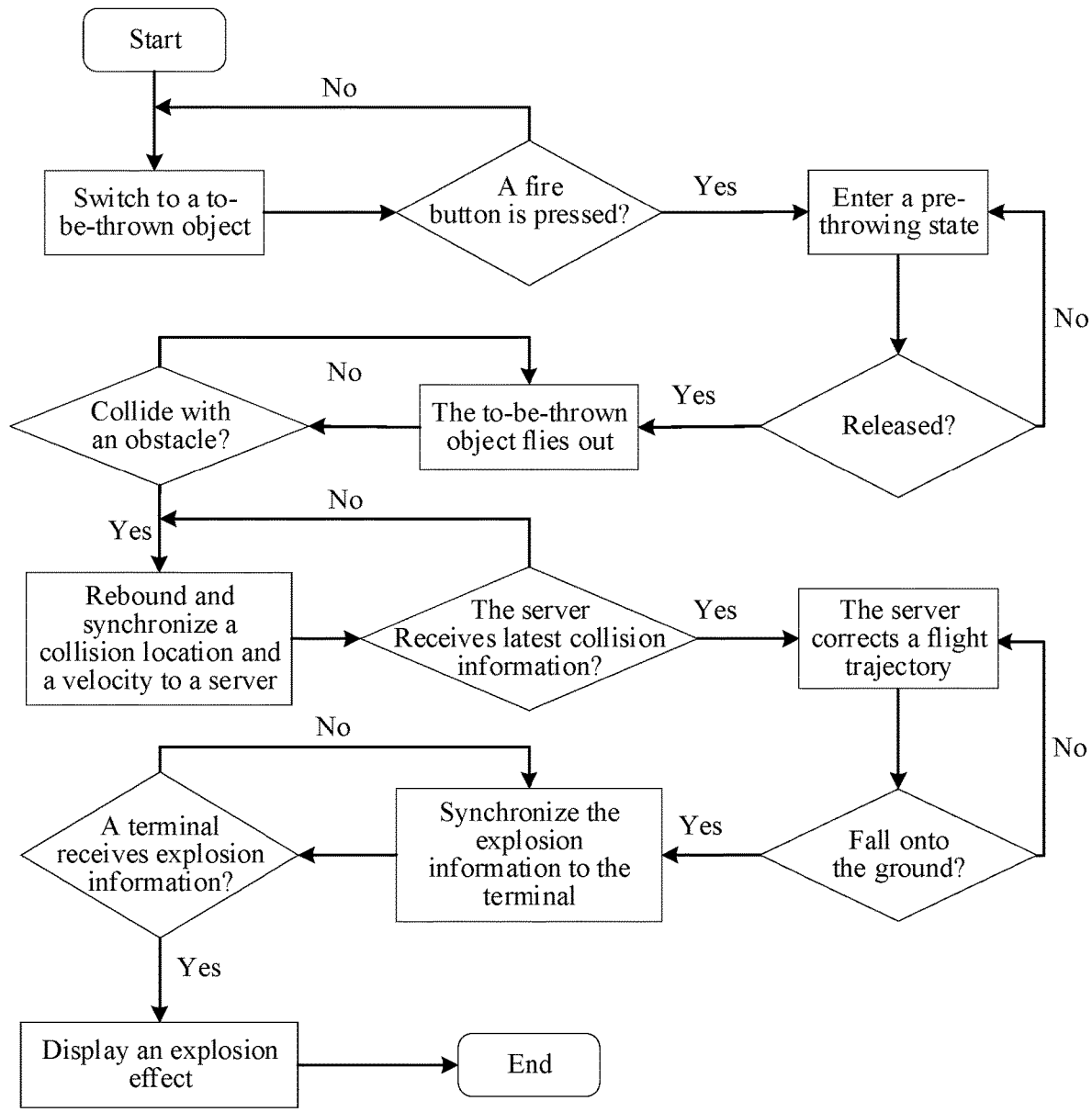
FIG. 14 is a flowchart of an exemplary data synchronization method according to an embodiment of this disclosure.

A specific example is provided below. As shown in FIG. 14, a specific process of the method includes the following steps.

Step I: Only to-be-thrown weapons (that is, the virtual prop of the foregoing target type) have the function in this game. Therefore, a to-be-thrown weapon is required to be switched first. A player may press a fire button (that is, the trigger control 502) to enter a pre-aiming state after switching to the to-be-thrown weapon. At this point, a red parabola (that is, the candidate movement trajectory 504) is displayed. The parabola is a trajectory, displayed to the player, along which the to-be-thrown object is about to fly. The parabola is calculated in one frame from the current location, a reverse direction, and a configured flight velocity. Then, a point may be collected for each small section (that is, a point may be obtained by calculation for each small section). All of the collected points are transmitted to a special effect line, and then the special effect line forms a trajectory (that is, the candidate movement trajectory 504) according to the points.

Step II: The to-be-thrown weapon is thrown after released by the user. This is because after the finger is loosened, finger touch information on a screen is changed, and then a pop-up information is calculated. The pop-up information is to trigger a fire event, and then the to-be-thrown object (that is, a virtual prop) is thrown out. After the to-be-thrown object is thrown out, the player can switch back to the original weapon (that is, the firearm virtual prop) if equipped with only one to-be-thrown object.

Step III: The to-be-thrown object may collide with a lot of things (that is, obstacles) during flight. The to-be-thrown object emits a ray forward at a small distance during the flight. An AB line segment is used for radiographic testing of the emitted ray. Since the to-be-thrown object flies along the parabolic trajectory, a direction and a velocity of the AB line segment corresponding to each frame are changed. The direction of the AB line segment is the tangential direction of the parabola.

In a case that an object is detected by radiographic testing, the information (that is, the type information of the obstacle) of the object for the collision may be learned. Then a collision location (that is, the collision information) and a calculated rebound direction (that is, the movement information) are both synchronized to the server. The server changes the movement trajectory of the determined to-be-thrown object in the server according to a new location, direction, velocity (that is, the movement information after the collision).

Step IV: The to-be-thrown object explodes after falling onto the ground (released, the release effect being displayed). The explosion information (that is, information including the target release location) of the server shall prevail. The server transmits the explosion information to a client. The client controls the to-be-thrown object to explode only when receiving the explosion information.

All the foregoing optional technical solutions may be arbitrarily combined to form an optional embodiment of this disclosure, and details are not described herein again.

Figure 15:
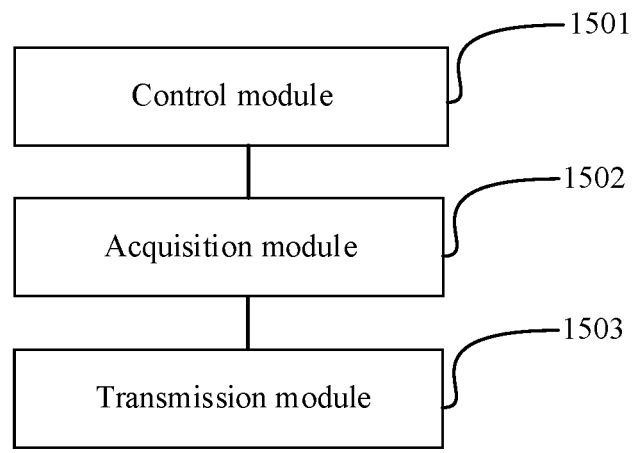
FIG. 15 is a schematic structural diagram of an exemplary data synchronization apparatus according to an embodiment of this disclosure.

FIG. 15 is a schematic structural diagram of a data synchronization apparatus according to an embodiment of this disclosure. In this disclosure, a unit and a module may be hardware such as a combination of electronic circuitries; firmware; or software such as computer instructions. The unit and the module may also be any combination of hardware, firmware, and software. In some implementation, a unit may include at least one module. Referring to FIG. 15, the apparatus includes:

- a control module 1501, configured to: control, in response to a throwing operation on a virtual prop, the virtual prop to move in a virtual scene according to a first movement trajectory;
- an acquisition module 1502, configured to acquire collision information and movement information of the virtual prop in response to a collision between the virtual prop and a virtual obstacle on the first movement trajectory; and
- a transmission module 1503, configured to transmit, to a server, synchronization information including the collision information and the movement information, the synchronization information being used for instructing the server to correct a second movement trajectory according to the collision information and the movement information, the second movement trajectory being a movement trajectory of the virtual prop acquired by the server.

In a possible implementation, the collision information includes collision location information. The movement information includes movement velocity information of the virtual prop after the collision.

The acquisition module 1502 includes:
- a location information acquisition unit, configured to acquire collision location information in response to a collision between the virtual prop and a virtual obstacle on the first movement trajectory; and
- a movement information acquisition unit, configured to determine the movement velocity information of the virtual prop after the collision based on the collision location information and the movement velocity information of the virtual prop during the collision.

In a possible implementation, the movement information acquisition unit is configured to:
- acquire rebound information corresponding to the virtual prop based on type information of the virtual obstacle; and
- determine movement velocity information of the virtual prop after the collision based on the collision location information, the rebound information, and the movement velocity information of the virtual prop during the collision.

In a possible implementation, the collision information includes the collision location information. The movement information includes the movement velocity information of the virtual prop during the collision.

The acquisition module 1502 is further configured to:
acquire the collision location information and the movement velocity information of the virtual prop during the collision in response to the collision between the virtual prop and the virtual obstacle on the first movement trajectory.

In a possible implementation, the apparatus further includes a collision detection module. The collision detection module is configured to:
- generate a ray of a target length based on a location of the virtual prop on the first movement trajectory, a direction of the ray being a tangential direction of the location of the virtual prop on the first movement trajectory; and
- determine, in response to the ray intersecting the virtual obstacle, that the virtual prop collides with the virtual obstacle.

In a possible implementation, the apparatus further includes:
- a receiving module, configured to receive a target release location transmitted by the server, the target release location being determined based on a corrected second movement trajectory; and
- a display module, configured to display a release effect of the virtual prop at the target release location in response to the virtual prop being at the target release location.

In a possible implementation, the target release location includes any one of the following:
- a drop point of the virtual prop, the drop point being determined according to the corrected second movement trajectory and a location of the ground in the virtual scene; or
- a location of the virtual prop on the second movement trajectory in a case that a throwing time of the virtual prop reaches a release time.

In a possible implementation, the apparatus further includes:
- a range determination module, configured to determine a release range of the virtual prop according to the target release location; and
- a playback module, configured to play a target animation within the release range, the target animation being used for indicating that a virtual item within the release range in the virtual scene varies with the release of the virtual prop.

In a possible implementation, the transmission module 1503 is configured to perform, in response to type information of the virtual prop being a target type, the operation of transmitting, to the server, the synchronization information including the collision information and the movement information. The virtual prop belonging to the target type has no adhesive properties.

In a possible implementation, at least one collision occurs between the virtual prop and the virtual obstacle on the first movement trajectory, and the second movement trajectory is corrected based on the collision information and the movement information during the at least one collision.

In a possible implementation, the control module 1501 is configured to:
- acquire and display the first movement trajectory of the virtual prop in response to the throwing operation on the virtual prop; and
- display a picture of movement of the virtual prop in the virtual scene along the first movement trajectory.

In the embodiments of this disclosure, in a case that the virtual prop collides with the virtual obstacle on the first movement trajectory during the movement according to the first movement trajectory, the collision information and the movement information of the virtual prop are synchronized to the server, so that the server may correct, according to the synchronized collision information and movement information, the second movement trajectory acquired by the server. In the foregoing data synchronization method, the movement trajectory of the virtual prop in the server is corrected by synchronizing the collision information and the collision-related movement information of the virtual prop, so as to be synchronized with the movement trajectory in the terminal. In this way, the movement trajectory of the virtual prop in the server is the same as that in the terminal, thereby enhancing the accuracy of the movement trajectory of the virtual prop. In addition, the movement trajectories obtained by the server and the terminal are the same, and drop points calculated by using the same movement trajectory are also the same. In this way, the release effect of the virtual prop can be displayed at the drop point. During data replication, the data synchronization apparatus provided in the foregoing embodiment is illustrated with an example of division of the foregoing functional modules during data synchronization. In actual application, the functions may be allocated to and completed by different functional modules according to requirements, that is, the internal structure of the electronic device is divided into different functional modules, to implement all or some of the functions described above. In addition, the data synchronization apparatus provided in the foregoing embodiment and the embodiments of the data synchronization method belong to the same concept. For a specific implementation process, reference may be made to the embodiments of the data synchronization method. Details are not described herein again.

Figure 16:
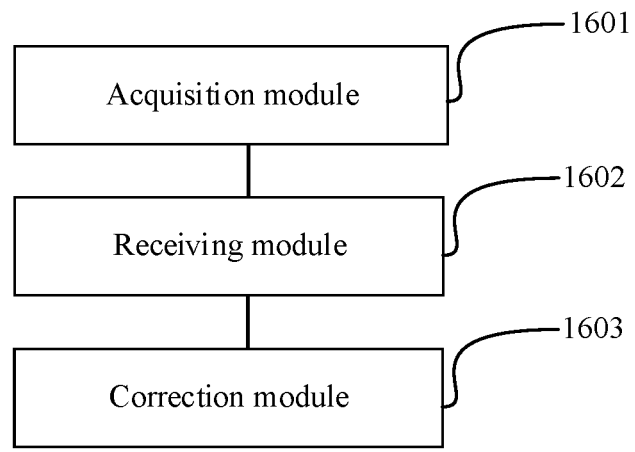
FIG. 16 is a schematic structural diagram of another exemplary data synchronization apparatus according to an embodiment of this disclosure.

FIG. 16 is a schematic structural diagram of a data synchronization apparatus according to an embodiment of this disclosure. Referring to FIG. 16, the apparatus includes:

- an acquisition module 1601, configured to acquire a second movement trajectory of a virtual prop in response to a throwing instruction on the virtual prop;
- a receiving module 1602, configured to receive synchronization information transmitted by a terminal, the synchronization information including collision information and movement information of the virtual prop and being transmitted by the terminal in a case that the virtual prop collides with a virtual obstacle on a first movement trajectory, the first movement trajectory being a movement trajectory of the virtual prop acquired by the terminal; and
- a correction module 1603, configured to correct the second movement trajectory according to the collision information and the movement information.

In the embodiments of this disclosure, after the virtual prop is thrown, the second movement trajectory of the virtual prop may be acquired. In a case that the virtual prop collides with the virtual obstacle during the movement, the collision information and the movement information of the virtual prop may be synchronized to the server, so that the server may correct, according to the synchronized collision information and movement information, the second movement trajectory acquired by the server. In the data synchronization method, the movement trajectory of the virtual prop in the server is corrected by receiving the collision-related information synchronized by the terminal, so as to be synchronized with the movement trajectory in the terminal. In this way, the movement trajectory of the virtual prop in the server is the same as that in the terminal, thereby enhancing the accuracy of the movement trajectory of the virtual prop. In addition, the movement trajectories obtained by the server and the terminal are the same, and drop points calculated by using the same movement trajectory are also the same. In this way, an explosion effect can be displayed at the drop point.

During data replication, the data synchronization apparatus provided in the foregoing embodiment is illustrated with an example of division of the foregoing functional modules during data synchronization. In actual application, the functions may be allocated to and completed by different functional modules according to requirements, that is, the internal structure of the electronic device is divided into different functional modules, to implement all or some of the functions described above. In addition, the data synchronization apparatus provided in the foregoing embodiment and the embodiments of the data synchronization method belong to the same concept. For a specific implementation process, reference may be made to the embodiments of the data synchronization method. Details are not described herein again.

Figure 17:
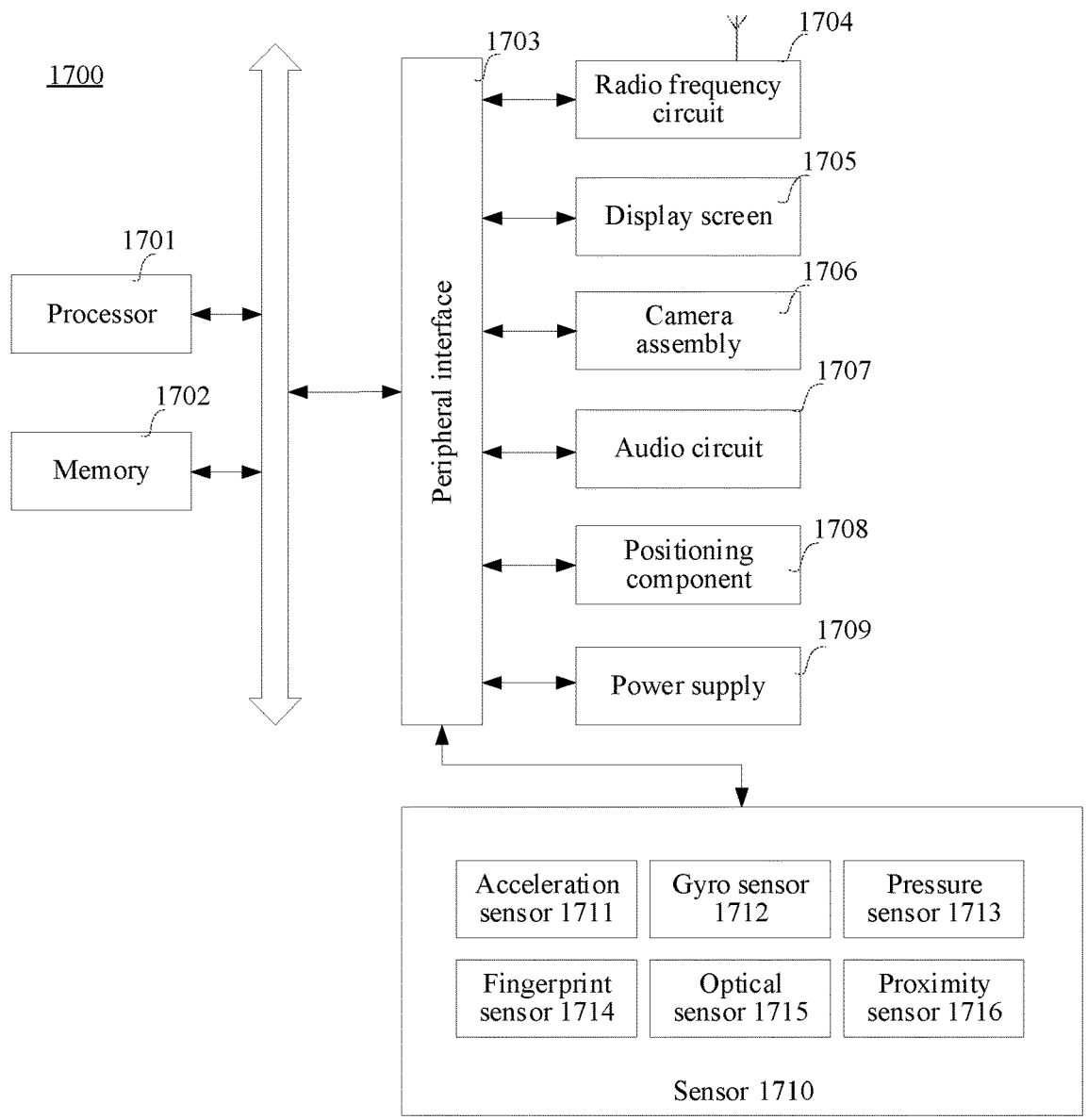
FIG. 17 is a schematic structural diagram of a terminal 1700 according to an embodiment of this disclosure.
Figure 18:
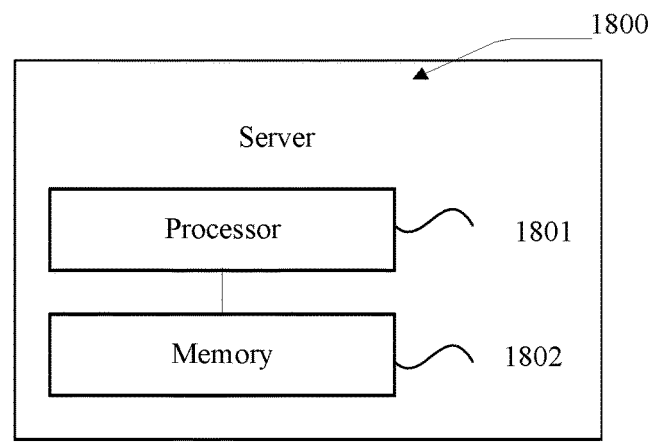
FIG. 18 is a schematic structural diagram of a server 1800 according to an embodiment of this disclosure.

The electronic device may be provided as a terminal shown in FIG. 17, or may be provided as a server shown in FIG. 18. This is not limited in the embodiments of this disclosure.

FIG. 17 is a schematic structural diagram of a terminal 1700 according to an embodiment of this disclosure. The terminal 1700 may be a smartphone, a tablet computer, a MP3 player, a MP4 player, a notebook computer, or a desktop computer. The terminal 1700 may also be referred to as other names such as user equipment, a portable terminal, a laptop terminal, or a desktop terminal.

Generally, the terminal 1700 includes a processor 1701 and a memory 1702.

The processor 1701 may include one or more processing cores, for example, a 4-core processor or an 8-core processor. The processor 1701 may be implemented in at least one hardware form of digital signal processor (DSP), a field programmable gate array (FPGA), or a programmable logic array (PLA). The processor 1701 may alternatively include a main processor and a coprocessor. The main processor is a processor that is configured to process data in an awake state and also referred to as a central processing unit (CPU), and the coprocessor is a low-power processor configured to process data in an idle state. In some embodiments, the processor 1701 may be integrated with a graphics processing unit (GPU). The GPU is configured to render and draw content that needs to be displayed on a display. In some embodiments, the processor 1701 may further include an AI processor. The AI processor is configured to process computing operations related to machine learning.

The memory 1702 may include one or more computer-readable storage media. The computer-readable storage media may be non-transitory. The memory 1702 may further include a high-speed random access memory, and a non-transitory memory such as one or more magnetic disk storage devices and a flash memory device. In some embodiments, a non-transitory computer-readable storage medium in the memory 1702 is configured to store at least one piece of program code, and the at least one piece of program code is configured to be executed by the processor 1701 to implement method steps on a terminal side of the data synchronization method provided in the embodiments of this disclosure.

In some embodiments, the terminal 1700 may optionally further include: a peripheral interface 1703 and at least one peripheral. The processor 1701, the memory 1702, and the peripheral interface 1703 may be connected by using a bus or a signal cable. Each peripheral may be connected to the peripheral interface 1703 by using a bus, a signal cable, or a circuit board. Specifically, the peripheral includes: at least one of a radio frequency circuit 1704, a touch display screen 1705, a camera assembly 1706, an audio circuit 1707, a positioning component 1708, or a power supply 1709.

The peripheral interface 1703 may be configured to connect at least one peripheral related to input/output (I/O) to the processor 1701 and the memory 1702. In some embodiments, the processor 1701, the memory 1702, and the peripheral interface 1703 are integrated on the same chip or circuit board. In some other embodiments, any one or two of the processors 1701, the memory 1702, and the peripheral interface 1703 may be implemented on an independent chip or circuit board. This is not limited in this embodiment.

The radio frequency circuit 1704 is configured to receive and transmit a radio frequency signal, also referred to as an electromagnetic signal. The radio frequency circuit 1704 communicates with a communication network and another communications device by using the electromagnetic signal. The radio frequency circuit 1704 converts an electrical signal into an electromagnetic signal for transmission, or converts a received electromagnetic signal into an electrical signal. Optionally, the radio frequency circuit 1704 includes: an antenna system, a radio frequency transceiver, one or more amplifiers, a tuner, an oscillator, a digital signal processor, a codec chip set, a subscriber identity module card, and the like. The radio frequency circuit 1704 may communicate with another terminal by using at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the radio frequency 1704 may further include a circuit related to near field communication (NFC), which is not limited in this application.

The display screen 1705 is configured to display a user interface (UI). The UI may include a graph, a text, an icon, a video, and any combination thereof. When the display screen 1705 is a touch display screen, the display screen 1705 is further capable of collecting touch signals on or above a surface of the display screen 1705. The touch signal may be inputted, as a control signal, to the processor 1701 for processing. In this case, the display screen 1705 may be further configured to provide a virtual button and/or a virtual keyboard, which is also referred to as a soft button and/or a soft keyboard. In some embodiments, there may be one display screen 1705 disposed on a front panel of the terminal 1700. In some other embodiments, there may be at least two display screens 1705 respectively disposed on different surfaces of the terminal 1700 or designed in a foldable shape. In still some other embodiments, the display screen 1705 may be a flexible display screen disposed on a curved surface or a folded surface of the terminal 1700. The display screen 1705 may further be set to have a non-rectangular irregular graph, that is, a special-shaped screen. The display screen 1705 may be manufactured by using a material such as a liquid crystal display (LCD), an organic light-emitting diode (OLED), or the like.

The camera assembly 1706 is configured to capture an image or a video. Optionally, the camera assembly 1706 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera assembly 1706 may further include a flash. The flash may be a single color temperature flash or a double color temperature flash. The double color temperature flash is a combination of a warm light flash and a cold light flash, and may be used for light compensation under different color temperatures.

The audio circuit 1707 may include a microphone and a speaker. The microphone is configured to acquire sound waves of a user and an environment, and convert the sound waves into electrical signals and input the electrical signals into the processor 1701 for processing, or input the electrical signals into the radio frequency circuit 1704 to implement voice communication. For a purpose of stereo acquisition or noise reduction, there may be a plurality of microphones disposed at different portions of the terminal 1700. The microphone may be further an array microphone or an omnidirectional microphone. The speaker is configured to convert electric signals from the processor 1701 or the radio frequency circuit 1704 into sound waves. The speaker may be a conventional thin-film speaker or a piezoelectric ceramic speaker. When the speaker is the piezoelectric ceramic speaker, the speaker cannot only convert an electrical signal into sound waves audible to a human being, but also convert an electrical signal into sound waves inaudible to the human being for ranging and other purposes. In some embodiments, the audio circuit 1707 may also include an earphone jack.

The positioning component 1708 is configured to position a current geographic position of the terminal 1700, to implement navigation or a location based service (LBS). The positioning component 1708 may be a positioning component based on the Global Positioning System (GPS) of the United States, the BeiDou system of China, the GLONASS System of Russia, or the GALILEO System of the European Union.

The power supply 1709 is configured to supply power to components in the terminal 1700. The power supply 1709 may be an alternating current, a direct current, a primary battery, or a rechargeable battery. When the power supply 1709 includes the rechargeable battery, the rechargeable battery may be a wired rechargeable battery or a wireless rechargeable battery. The rechargeable battery may be further configured to support a fast charge technology.

In some embodiments, the terminal 1700 may also include one or more sensors 1710. The one or more sensors 1710 include, but are not limited to, an acceleration sensor 1711, a gyroscope sensor 1712, a pressure sensor 1713, a fingerprint sensor 1714, an optical sensor 1715, and a proximity sensor 1716.

The acceleration sensor 1711 may detect a magnitude of acceleration on three coordinate axes of a coordinate system established with the terminal 1700. For example, the acceleration sensor 1711 may be configured to detect components of gravity acceleration on the three coordinate axes. The processor 1701 may control, according to a gravity acceleration signal acquired by the acceleration sensor 1711, the touch display screen 1705 to display the user interface in a frame view or a portrait view. The acceleration sensor 1711 may be further configured to acquire motion data of a game or a user.

The gyroscope sensor 1712 may detect a body direction and a rotation angle of the terminal 1700. The gyroscope sensor 1712 may cooperate with the acceleration sensor 1711 to acquire a 3D action by the user on the terminal 1700. The processor 1701 may implement the following functions according to the data acquired by the gyroscope sensor 1712: motion sensing (such as changing the UI according to a tilt operation of the user), image stabilization at shooting, game control, and inertial navigation.

The pressure sensor 1713 may be disposed on a side frame of the terminal 1700 and/or a lower layer of the touch display screen 1705. When the pressure sensor 1713 is disposed on the side frame of the terminal 1700, a holding signal of the user on the terminal 1700 may be detected. The processor 1701 performs left and right hand recognition or a quick operation according to the holding signal collected by the pressure sensor 1713. When the pressure sensor 1713 is disposed on the lower layer of the touch display screen 1705, the processor 1701 controls, according to a pressure operation of the user on the touch display screen 1705, an operable control on the UI. The operable control includes at least one of a button control, a scroll bar control, an icon control, and a menu control.

The fingerprint sensor 1714 is configured to collect a fingerprint of a user. The processor 1701 identifies an identity of the user according to the fingerprint collected by the fingerprint sensor 1714, or the fingerprint sensor 1714 identifies an identity of the user according to the collected fingerprint. When identifying that the identity of the user is a trusted identity, the processor 1701 authorizes the user to perform related sensitive operations. The sensitive operations include: unlocking a screen, viewing encrypted information, downloading software, paying, changing a setting, and the like. The fingerprint sensor 1714 may be disposed on a front surface, a back surface, or a side surface of the terminal 1700. When a physical button or a vendor logo is disposed on the terminal 1700, the fingerprint sensor 1714 may be integrated with the physical button or the vendor logo.

The optical sensor 1715 is configured to collect ambient light intensity. In an embodiment, the processor 1701 may control display brightness of the touch display screen 1705 according to the ambient light intensity collected by the optical sensor 1715. Specifically, when the ambient light intensity is relatively high, the display brightness of the touch display screen 1705 is increased. When the ambient light intensity is relatively low, the display brightness of the touch display screen 1705 is reduced. In another embodiment, the processor 1701 may further dynamically adjust a camera parameter of the camera assembly 1706 according to the ambient light intensity acquired by the optical sensor 1715.

The proximity sensor 1716, also referred to as a distance sensor, is usually disposed on a front panel of the terminal 1700. The proximity sensor 1716 is configured to collect a distance between a user and the front surface of the terminal 1700. In an embodiment, when the proximity sensor 1716 detects that the distance between the user and the front surface of the terminal 1700 is gradually decreased, the processor 1701 controls the touch display screen 1705 to switch from a screen-on state to a screen-off state. When the proximity sensor 1716 detects that the distance between the user and the front surface of the terminal 1700 is gradually increased, the processor 1701 controls the touch display screen 1705 to switch from the screen-off state to the screen-on state.

A person skilled in the art may understand that a structure shown in FIG. 17 constitutes no limitation on the terminal 1700, and the terminal may include more or fewer components than those shown in the figure, or combine some components, or use a different component deployment.

FIG. 18 is a schematic structural diagram of a server 1800 according to an embodiment of this disclosure. The server 1800 may vary greatly due to different configurations or performance, and may include one or more central processing units (CPUs) 1801 and one or more memories 1802. The memory 1802 stores at least one piece of program code, the at least one piece of program code being loaded and executed by the processor 1801 to implement the method steps of a server side of the data synchronization method provided in the foregoing method embodiments. Certainly, the server 1800 may also have a wired or wireless network interface, a keyboard, an input/output interface and other components to facilitate input/output. The server 1800 may also include other components for implementing device functions. Details are not described herein.

In an exemplary embodiment, a non-transitory computer-readable storage medium is further provided, for example, a memory including at least one piece of program code is further provided. The at least one piece of program code may be executed by a processor in an electronic device to implement the data synchronization method in the foregoing embodiments. For example, the non-transitory computer-readable storage medium may be a read-only memory (ROM), a random access memory (RAM), a compact disc read-only memory (CD-ROM), a magnetic tape, a floppy disk, an optical data storage device, or the like.

An embodiment of this disclosure further provides a computer program product or a computer program. The computer program product or the computer program includes computer instructions, and the computer instructions are stored in a non-transitory computer-readable storage medium. A processor of a computer device reads the computer instructions from the non-transitory computer-readable storage medium, and executes the computer instructions, so that the computer device performs the data synchronization method provided in the various implementations of the foregoing aspects.

Those of ordinary skill in the art may understand that all or part of the steps of implementing the foregoing embodiments may be implemented by hardware, or may be implemented by a program instructing related hardware. The program may be stored in a non-transitory computer-readable storage medium. The non-transitory storage medium mentioned may be a read-only memory, a magnetic disk or an optical disc.

The foregoing descriptions are merely optional embodiments of this disclosure, but are not intended to limit this application. Any modification, equivalent replacement, or improvement made within the spirit and principle of this application shall fall within the protection scope of this application.

What is claimed is:

1. A data synchronization method, applicable to a terminal, the method comprising:
in response to a throwing operation on a virtual prop, controlling the virtual prop to move in a virtual scene according to a first movement trajectory, wherein the first movement trajectory is a movement trajectory of the virtual prop determined by the terminal and a corresponding second movement trajectory is a movement trajectory of the virtual prop determined by a server;
acquiring collision information and movement information of the virtual prop in response to a collision between the virtual prop and a virtual obstacle on the first movement trajectory; and
transmitting, to I server, synchronization information comprising the collision information and the movement information, the synchronization information being used for instructing the server to correct a second movement trajectory according to the collision information and the movement information such that the second movement trajectory matches the first movement trajectory; and
obtaining, from the server, a drop point of the virtual prop that is calculated by the server based on the corrected second movement trajectory.

2. The method according to claim 1, wherein:
the collision information comprises collision location information;

the movement information comprises movement velocity information of the virtual prop after the collision; and acquiring the collision information and the movement information of the virtual prop in response to the collision between the virtual prop and the virtual obstacle on the first movement trajectory comprises:

acquiring the collision location information in response to the collision between the virtual prop and the virtual obstacle on the first movement trajectory; and determining the movement velocity information of the virtual prop after the collision based on the collision location information and movement velocity information of the virtual prop when the collision occurs.

3. The method according to claim 2, wherein determining the movement velocity information of the virtual prop after the collision based on the collision location information and movement velocity information of the virtual prop when the collision occurs comprises:

acquiring rebound information corresponding to the virtual prop based on type information of the virtual obstacle; and determining the movement velocity information of the virtual prop after the collision based on the collision location information, the rebound information, and the movement velocity information of the virtual prop when the collision occurs.

4. The method according to claim 1, wherein:

the collision information comprises collision location information, and the movement information comprises movement velocity information of the virtual prop when the collision occurs; and acquiring the collision information and the movement information of the virtual prop in response to the collision between the virtual prop and the virtual obstacle on the first movement trajectory comprises:

in response to the collision between the virtual prop and the virtual obstacle being on the first movement trajectory, acquiring the collision location information and the movement velocity information of the virtual prop when the collision occurs.

5. The method according to claim 1, wherein after controlling the virtual prop to move in the virtual scene according to the first movement trajectory, the method further comprises:

generating a ray of a target length based on a location of the virtual prop on the first movement trajectory, a direction of the ray being a tangential direction of the location of the virtual prop on the first movement trajectory; and determining, in response to the ray intersecting the virtual obstacle, that the virtual prop collides with the virtual obstacle.

6. The method according to claim 1, further comprising:

receiving a target release location transmitted by the server, the target release location being determined based on the corrected second movement trajectory; and displaying a release effect of the virtual prop at the target release location in response to the virtual prop being at the target release location.

7. The method according to claim 6, wherein the target release location comprises any one of the following:

the drop point of the virtual prop that is calculated by the server based on the corrected second movement trajectory and a location of a ground in the virtual scene; or a location of the virtual prop on the second movement trajectory in response to a release time being reached after the throwing operation on the virtual prop.

8. The method according to claim 6, further comprising:

determining a release location range of the virtual prop according to the target release location; and playing a target animation within the release location range, the target animation being used for indicating that a virtual item within the release location range in the virtual scene changes in respond to the release of the virtual prop.

9. The method according to claim 1, wherein transmitting, to the server, the synchronization information comprising the collision information and the movement information comprises:

in response to the virtual prop belonging to a target type, transmitting, to the server, the synchronization information comprising the collision information and the movement information, the target type being characterized by having no adhesive properties.

10. The method according to claim 1, wherein at least one collision occurs between the virtual prop and the virtual obstacle on the first movement trajectory, the second movement trajectory being corrected based on the collision information and the movement information when the at least one collision occurs.

11. The method according to claim 1, wherein, in response to the throwing operation on the virtual prop, controlling the virtual prop to move in the virtual scene according to the first movement trajectory comprises:

acquiring and displaying the first movement trajectory of the virtual prop in response to the throwing operation on the virtual prop; and displaying a picture of movement of the virtual prop in the virtual scene along the first movement trajectory.

12. A device comprising a memory for storing computer instructions and a processor in communication with the memory, wherein, when the processor executes the computer instructions, the processor is configured to cause the device to:

in response to a throwing operation on a virtual prop, control the virtual prop to move in a virtual scene according to a first movement trajectory, wherein the first movement trajectory is a movement trajectory of the virtual prop determined by the terminal and a corresponding second movement trajectory is a movement trajectory of the virtual prop determined by a server;

acquire collision information and movement information of the virtual prop in response to a collision between the virtual prop and a virtual obstacle on the first movement trajectory; and transmit, to the server, synchronization information comprising the collision information and the movement information, the synchronization information being used for instructing the server to correct a second movement trajectory according to the collision information and the movement information such that the second movement trajectory matches the first movement trajectory; and obtain, from the server, a drop point of the virtual prop that is calculated by the server based on the corrected second movement trajectory.

13. The device according to claim 12, wherein:

the collision information comprises collision location information;

the movement information comprises movement velocity information of the virtual prop after the collision; and when the processor is configured to cause the device to acquire the collision information and the movement information of the virtual prop in response to the collision between the virtual prop and the virtual obstacle on the first movement trajectory, the processor is configured to cause the device to:

acquire the collision location information in response to the collision between the virtual prop and the virtual obstacle on the first movement trajectory; and determine the movement velocity information of the virtual prop after the collision based on the collision location information and movement velocity information of the virtual prop when the collision occurs.

14. The device according to claim 13, wherein, when the processor is configured to cause the device to determine the movement velocity information of the virtual prop after the collision based on the collision location information and movement velocity information of the virtual prop when the collision occurs, the processor is configured to cause the device to:

acquire rebound information corresponding to the virtual prop based on type information of the virtual obstacle; and determine the movement velocity information of the virtual prop after the collision based on the collision location information, the rebound information, and the movement velocity information of the virtual prop when the collision occurs.

15. The device according to claim 12, wherein:

the collision information comprises collision location information, and the movement information comprises movement velocity information of the virtual prop when the collision occurs; and when the processor is configured to cause the device to acquire the collision information and the movement information of the virtual prop in response to the collision between the virtual prop and the virtual obstacle on the first movement trajectory, the processor is configured to cause the device to:

in response to the collision between the virtual prop and the virtual obstacle being on the first movement trajectory, acquire the collision location information and the movement velocity information of the virtual prop when the collision occurs.

16. The device according to claim 12, wherein, after the processor is configured to cause the device to control the virtual prop to move in the virtual scene according to the first movement trajectory, the processor is configured to further cause the device to:

generate a ray of a target length based on a location of the virtual prop on the first movement trajectory, a direction of the ray being a tangential direction of the location of the virtual prop on the first movement trajectory; and determine, in response to the ray intersecting the virtual obstacle, that the virtual prop collides with the virtual obstacle.

17. The device according to claim 12, wherein the processor is configured to further cause the device to:

receive a target release location transmitted by the server, the target release location being determined based on the corrected second movement trajectory; and display a release effect of the virtual prop at the target release location in response to the virtual prop being at the target release location.

18. A non-transitory storage medium for storing computer readable instructions, the computer readable instructions, when executed by a processor, causing the processor to:

in response to a throwing operation on a virtual prop, control the virtual prop to move in a virtual scene according to a first movement trajectory, wherein the first movement trajectory is a movement trajectory of the virtual prop determined by the terminal and a corresponding second movement trajectory is a movement trajectory of the virtual prop determined by a server;

acquire collision information and movement information of the virtual prop in response to a collision between the virtual prop and a virtual obstacle on the first movement trajectory; and transmit, to the server, synchronization information comprising the collision information and the movement information, the synchronization information being used for instructing the server to correct a second movement trajectory according to the collision information and the movement information such that the second movement trajectory matches the first movement trajectory; and obtain, from the server, a drop point of the virtual prop that is calculated by the server based on the corrected second movement trajectory.

19. The non-transitory storage medium according to claim 18, wherein:

the collision information comprises collision location information;

the movement information comprises movement velocity information of the virtual prop after the collision; and when the computer readable instructions cause the processor to acquire the collision information and the movement information of the virtual prop in response to the collision between the virtual prop and the virtual obstacle on the first movement trajectory, the computer readable instructions cause the processor to:

acquire the collision location information in response to the collision between the virtual prop and the virtual obstacle on the first movement trajectory; and determine the movement velocity information of the virtual prop after the collision based on the collision location information and movement velocity information of the virtual prop when the collision occurs.

20. The non-transitory storage medium according to claim 19, wherein, when the computer readable instructions cause the processor to determine the movement velocity information of the virtual prop after the collision based on the collision location information and movement velocity information of the virtual prop when the collision occurs, the computer readable instructions cause the processor to:

acquire rebound information corresponding to the virtual prop based on type information of the virtual obstacle; and determine the movement velocity information of the virtual prop after the collision based on the collision location information, the rebound information, and the movement velocity information of the virtual prop when the collision occurs.

\* \* \* \* \*